(12) United States Patent
Shimoshikiryoh et al.

(10) Patent No.: US 11,538,435 B2
(45) Date of Patent: Dec. 27, 2022

(54) DIMMING PANEL AND LIQUID CRYSTAL DISPLAY DEVICE

(71) Applicant: Sharp Kabushiki Kaisha, Sakai (JP)

(72) Inventors: Fumikazu Shimoshikiryoh, Sakai (JP); Shigeyuki Yamada, Sakai (JP); Takehisa Yoshida, Sakai (JP)

(73) Assignee: SHARP KABUSHIKI KAISHA, Sakai (JP)

( * ) Notice: Subject to any disclaimer, the term of this patent is extended or adjusted under 35 U.S.C. 154(b) by 0 days.

(21) Appl. No.: 17/544,003

(22) Filed: Dec. 7, 2021

(65) Prior Publication Data
US 2022/0180835 A1 Jun. 9, 2022

Related U.S. Application Data

(60) Provisional application No. 63/122,497, filed on Dec. 8, 2020.

(51) Int. Cl.
*G09G 3/36* (2006.01)
*G09G 3/34* (2006.01)
*G02F 1/1335* (2006.01)
*G09G 5/10* (2006.01)

(52) U.S. Cl.
CPC ..... *G09G 3/3696* (2013.01); *G02F 1/133612* (2021.01); *G09G 3/3406* (2013.01); *G09G 5/10* (2013.01); *G09G 2320/0626* (2013.01)

(58) Field of Classification Search
CPC ... G06F 3/0446; G06F 3/0412; G06F 3/04166
See application file for complete search history.

(56) References Cited

U.S. PATENT DOCUMENTS

| | | | | |
|---|---|---|---|---|
| 4,595,919 A | * | 6/1986 | Holz | G09G 3/2813 345/63 |
| 2016/0195957 A1 | * | 7/2016 | Reynolds | G06F 3/0416 345/174 |
| 2017/0192581 A1 | * | 7/2017 | Shamarao | G06F 3/0446 |

FOREIGN PATENT DOCUMENTS

WO 2008/053724 A1 5/2008

OTHER PUBLICATIONS

WO2008053724 Fujii Akiyoshi. English machine translation (Year: 2008).*

* cited by examiner

*Primary Examiner* — Van N Chow
(74) *Attorney, Agent, or Firm* — Keating & Bennett, LLP

(57) ABSTRACT

The present invention provides a dimming panel including: a drive circuit; and dimming units arranged in one direction from a drive circuit, the dimming panel sequentially including a first substrate, a liquid crystal layer, and a second substrate, the first substrate sequentially including an insulating substrate, connection lines formed from a transparent conductive material and connected to the drive circuit, a first insulating layer, a first electrode, a second insulating layer, and a second electrode, the first electrode or the second electrode including dimming electrodes disposed for the respective dimming units, each of the dimming electrodes being electrically connected to one of the connection lines, an electrode width of at least one of the connection lines increasing in response to a distance from the drive circuit.

12 Claims, 30 Drawing Sheets

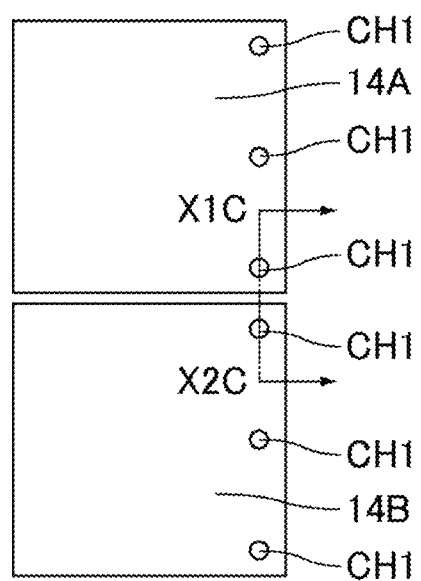

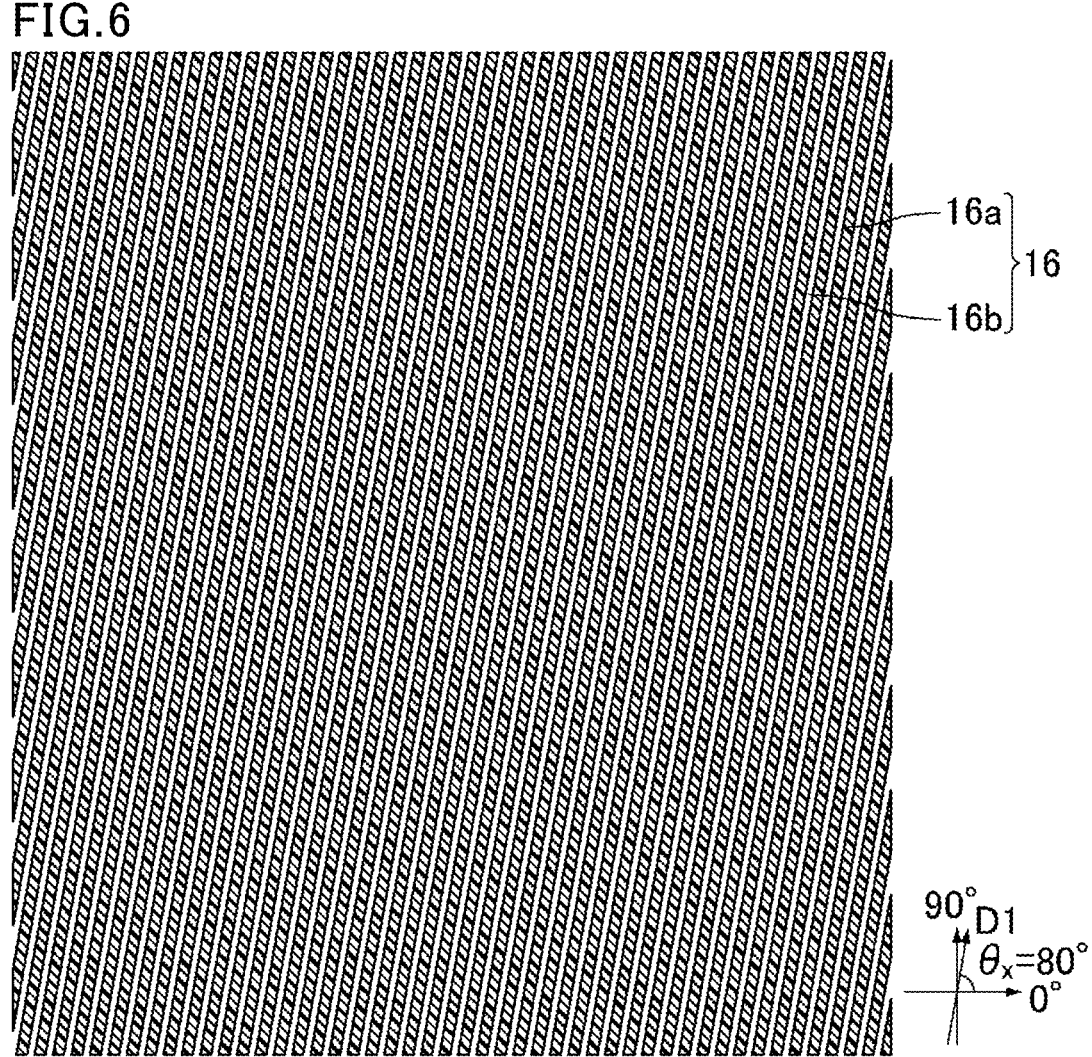

DIMMING PANEL AND LIQUID CRYSTAL DISPLAY DEVICE

CROSS-REFERENCE TO RELATED APPLICATIONS

The present application claims priority under 35 U.S.C. § 119 to U.S. provisional Patent Application No. 63/122,497 filed on Dec. 8, 2020, the contents of which are incorporated herein by reference in their entirety.

BACKGROUND OF THE INVENTION

Field of the Invention

The present invention relates to dimming panels and liquid crystal display devices.

Description of Related Art

Dimming panels are panels that can control the transmittance of light in response to the voltage applied to the panel. For example, a dimming panel can be used as an optical member that is placed between an image-providing liquid crystal panel and a backlight and controls the amount of light emitted from the backlight (hereinafter, also referred to as backlight illumination) transmitted, or as a member that controls the amount of external light transmitted into a building, a vehicle, or the like. One of dimming methods using such a dimming panel includes preparing a liquid crystal composition sealed between a pair of substrates and applying a voltage to the liquid crystal composition and thereby changing the alignment of liquid crystal molecules and controlling the amount of light transmitted through the dimming panel.

Liquid crystal display devices are display devices utilizing a liquid crystal composition to display images. In a typical display mode thereof, a liquid crystal panel containing a liquid crystal composition between a pair of substrates is irradiated with light from a backlight and voltage is applied to the liquid crystal composition to change the alignment of liquid crystal molecules, whereby the amount of light transmitted through the liquid crystal panel is controlled. Such liquid crystal display devices have advantageous features such as thin profile, light weight, and low power consumption, and are therefore used in electronic devices such as televisions, smartphones, tablet PCs, and automotive navigation systems.

A study on liquid crystal display devices has been made in which a dimming panel is disposed between an image-providing liquid crystal panel and the backlight. For example, WO 2008/053724 discloses a liquid crystal display device including: an image-providing panel that includes a liquid crystal display panel; a light source for illuminating the liquid crystal display panel; and a dimming panel disposed between the image-providing panel and the light source, the dimming panel including a transmissive liquid crystal display panel and performing grayscale display based on luminance information in a video image signal input to the image-providing panel, wherein the dimming panel includes pixels having a size greater than pixels constituting the image-providing panel. The "pixels constituting the dimming panel" in WO 2008/053724 correspond to "dimming units" herein. The "dimming units" will be described later.

BRIEF SUMMARY OF THE INVENTION

An example of a method for driving a dimming panel is a segment driving mode in which dimming electrodes disposed for the respective dimming units are each connected to a drive circuit via a connection line and voltages applied to the respective dimming electrodes are controlled. In terms of the charging rate of the dimming electrodes, a metal material having a high electrical conductivity, such as aluminum, titanium, or molybdenum is considered to be used as the material for the connection lines. Unfortunately, use of such a metal material may reduce the aperture ratio of the dimming panel and may cause, in use of such a dimming panel stacked on or above an image-providing liquid crystal panel, interference between connection lines and lines defining the image-providing liquid crystal panel to possibly cause moiré.

The present inventors studied a method for improving the aperture ratio of the dimming panel and reducing moiré, and focused on use of a transparent conductive material such as indium tin oxide (ITO) as the material for the connection lines. Unfortunately, transparent conductive materials such as ITO have lower electrical conductivity than the above metal materials. Thus, a connection line formed from a transparent conductive material such as ITO has a high wire resistance to possibly cause insufficient charging of dimming electrodes located far from the drive circuit.

The present inventors found that use of a transparent conductive material for connection lines can improve the aperture ratio of the dimming panel and thereby can reduce the occurrence of moiré, and that increasing the electrode widths of the connection lines in response to an increase in the distance from the drive circuit can reduce the wire resistance and increase the charging rate.

WO 2008/053724 discloses in FIG. 19 that disposing a dummy line not directly connected to a driver for driving can reduce the changes in aperture ratio between respective pixels and give less influence on the pixels.

Unfortunately, use of such a dummy line not connected to the driver for driving cannot reduce the wire resistance. In addition, changing the line width is not discussed in the document.

The present invention was made under the current situation in the art and aims to provide a dimming panel that achieves a high aperture ratio and a high charging rate and is less likely to cause moiré even when stacked above an image-providing liquid crystal panel, and a liquid crystal display device including the dimming panel.

(1) One embodiment of the present invention is directed to a dimming panel including: a drive circuit; and dimming units arranged in one direction from a drive circuit, the dimming panel sequentially including a first substrate, a liquid crystal layer, and a second substrate, the first substrate sequentially including an insulating substrate, connection lines formed from a transparent conductive material and connected to the drive circuit, a first insulating layer, a first electrode, a second insulating layer, and a second electrode, the first electrode or the second electrode including dimming electrodes disposed for the respective dimming units, each of the dimming electrodes being electrically connected to one of the connection lines, an electrode width of at least one of the connection lines increasing in response to a distance from the drive circuit.

(2) In an embodiment of the present invention, the dimming panel includes the structure (1), the first electrode includes first dimming electrodes disposed for the respective dimming units, and the drive circuit is configured to control voltages applied to the respective first dimming electrodes and apply a constant voltage to the second electrode.

(3) In an embodiment of the present invention, the dimming panel includes the structure (2), the first substrate sequentially includes between the insulating substrate and the first electrode a lower-layer electrode and a third insulating layer from an insulating substrate side, each of the first dimming electrodes includes island electrodes spaced from each other in a plan view and electrically connected to each other, and at least one of the island electrodes is electrically connected to the lower-layer electrode through a contact hole.

(4) In an embodiment of the present invention, the dimming panel includes the structure (3), at least one of the island electrodes of a selected first dimming electrode among the first dimming electrodes is disposed in a position between island electrodes of an adjacent first dimming electrode, and at least one of the island electrodes of the adjacent first dimming electrode is disposed in a position between island electrodes of the selected first dimming electrode.

(5) In an embodiment of the present invention, the dimming panel includes the structure (3) or (4), each of the first dimming electrodes further includes a base electrode provided with apertures, the island electrodes surround the base electrode in a plan view, the base electrode is electrically connected to the lower-layer electrode through a different contact hole, at least one of the island electrodes of a selected first dimming electrode among the first dimming electrodes is disposed in a position inside at least one of the apertures of an adjacent first dimming electrode, and at least one of the island electrodes of the adjacent first dimming electrode is disposed in a position inside at least one of the apertures of the selected first dimming electrode.

(6) In an embodiment of the present invention, the dimming panel includes the structure (1), the second electrode includes second dimming electrodes disposed for the respective dimming units, and the drive circuit is configured to apply a constant voltage to the first electrode and control voltages applied to the respective second dimming electrodes.

(7) One embodiment of the present invention is directed to a liquid crystal display device sequentially including: an image-providing liquid crystal panel; the dimming panel according to any one of structures (1) to (6); and a backlight.

The present invention can provide a dimming panel that achieves a high aperture ratio and a high charging rate and is less likely to case moiré even when stacked above an image-providing liquid crystal panel, and a liquid crystal display device including the dimming panel.

BRIEF DESCRIPTION OF THE DRAWINGS

FIG. 4 is a schematic plan view of two adjacent first dimming electrodes shown in FIG. 3.

FIG. 6 is an enlarged schematic plan view showing a part of the second electrode shown in FIG. 5A.

DETAILED DESCRIPTION OF THE INVENTION

Hereinafter, dimming panels and liquid crystal display devices according to embodiments of the present invention are described. The embodiments, however, are not intended to limit the scope of the present invention. The design may be modified as appropriate within the range satisfying the configuration of the present invention.

Embodiment 1

Figure 1:
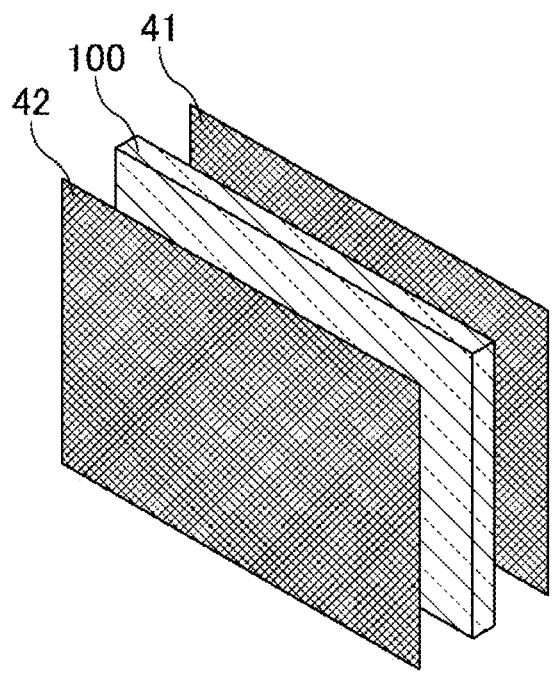
FIG. 1 is an exploded perspective view of a dimming panel of Embodiment 1.

FIG. 1 is an exploded perspective view of a dimming panel of Embodiment 1. As shown in FIG. 1, a dimming panel 100 may be sandwiched by a first polarizer 41 and a second polarizer 42. The first polarizer 41 and the second polarizer 42 are linear polarizers whose absorption axes are perpendicular to each other, for example.

Figure 2:
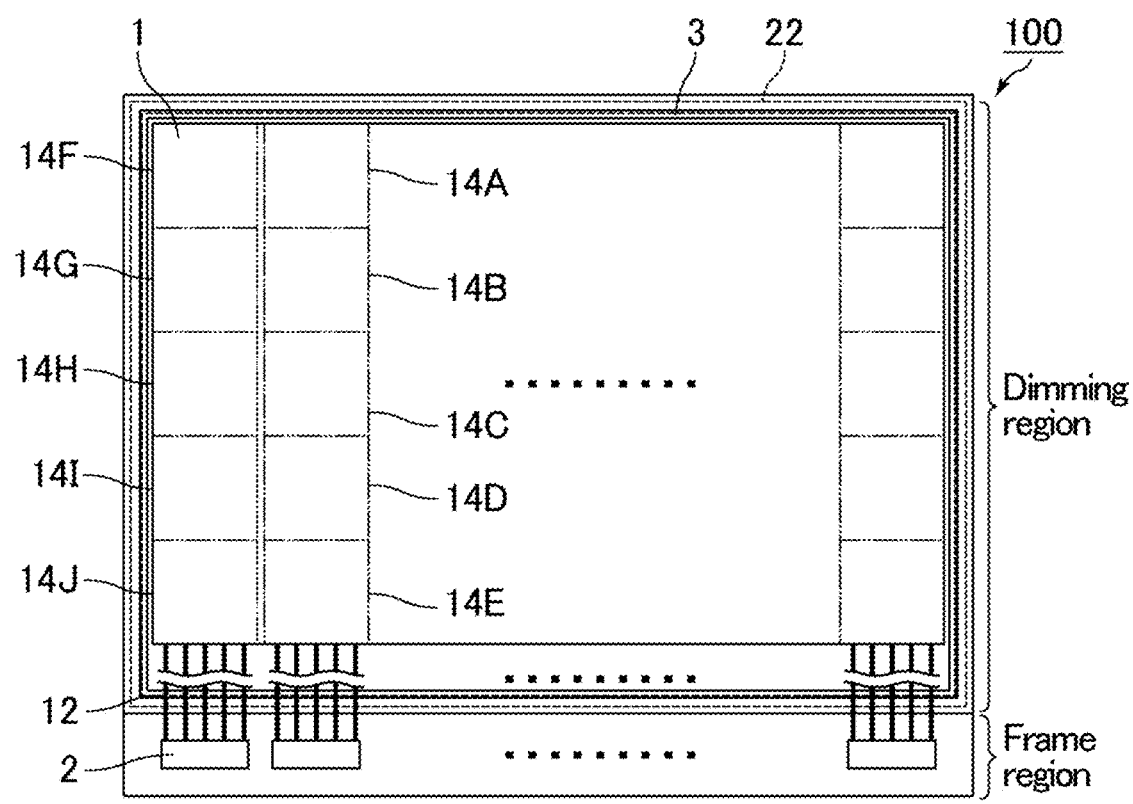
FIG. 2 is a schematic plan view of the dimming panel of Embodiment 1.

FIG. 2 is a schematic plan view of the dimming panel of Embodiment 1. As shown in FIG. 2, the dimming panel 100 includes drive circuits 2 and dimming units 1 arranged in one direction from the drive circuit 2. The dimming unit is a unit for controlling the amount of light transmitted through the dimming panel. The dimming panel 100 includes the dimming units 1 arranged in the in-plane direction. The dimming units 1 may be arranged in the row and column directions of the dimming panel 100. A region provided with the dimming units 1 is also referred to as a dimming region, and a common line 3 may be provided to surround the dimming region in a plan view. Each of the dimming units is provided with a dimming electrode, and the later-described first electrode or second electrode includes multiple dimming electrodes disposed for the respective dimming units 1. Embodiment 1 describes the case where the first electrode includes first dimming electrodes disposed for the respective dimming units 1.

As shown in FIG. 2, first dimming electrodes 14A, 14B, 14C, 14D, and 14E arranged in the column direction of the dimming panel are connected to one drive circuit 2. FIG. 2 shows an example in which dimming units arranged in one column are connected to one drive circuit.

Alternatively, dimming units arranged in multiple columns may be connected to one drive circuit. Each of the dimming electrodes is electrically connected to one of the connection lines.

The connection lines 12 are formed of a transparent conductive material. If the connection lines 12 are metal lines formed of the metal material, the dimming panel has a reduced transmittance. In addition, when such a dimming panel is stacked on or above the image-providing liquid crystal panel described later, the connection lines may interfere with members of the image-providing liquid crystal panel, such as lines including gate lines and source lines and black matrix, which may cause moiré. In order to reduce the moiré, a diffuser is typically disposed between the image-providing liquid crystal panel and the dimming panel. However, use of the diffuser further reduces the transmittance of the liquid crystal display device. In contrast, use of a transparent conductive material for the connection lines can increase the transmittance of the dimming panel and can reduce the occurrence of moiré. Furthermore, the transmittance of the liquid crystal display device can be increased because there is no need to dispose a diffuser for reducing the occurrence of moiré.

Examples of the transparent conductive material include indium tin oxide (ITO) and indium zinc oxide (IZO).

The dimming panel 100 is driven in the segment driving mode in which the drive circuits 2 control the voltages applied to the respective dimming electrodes. Another exemplary driving mode is a matrix driving mode in which switching elements such as TFTs are disposed for the respective dimming units to control voltages applied to the dimming electrodes of the dimming units. The segment driving mode, differently from the matrix driving mode, can take one frame period for charging the dimming electrodes. This enables charging even with the use, as the material for the connection lines, of a transparent conductive material such as ITO or IZO, which has lower electrical conductivity than metal materials that are suitably used in the matrix driving mode and have high electrical conductivity, such as copper, aluminum, titanium, and molybdenum. Moreover, a dimming panel driven in the segment driving mode does not include TFTs and thus has a merit of preventing a reduction in reliability due to shifting of threshold voltages of TFTs.

Figure 3:
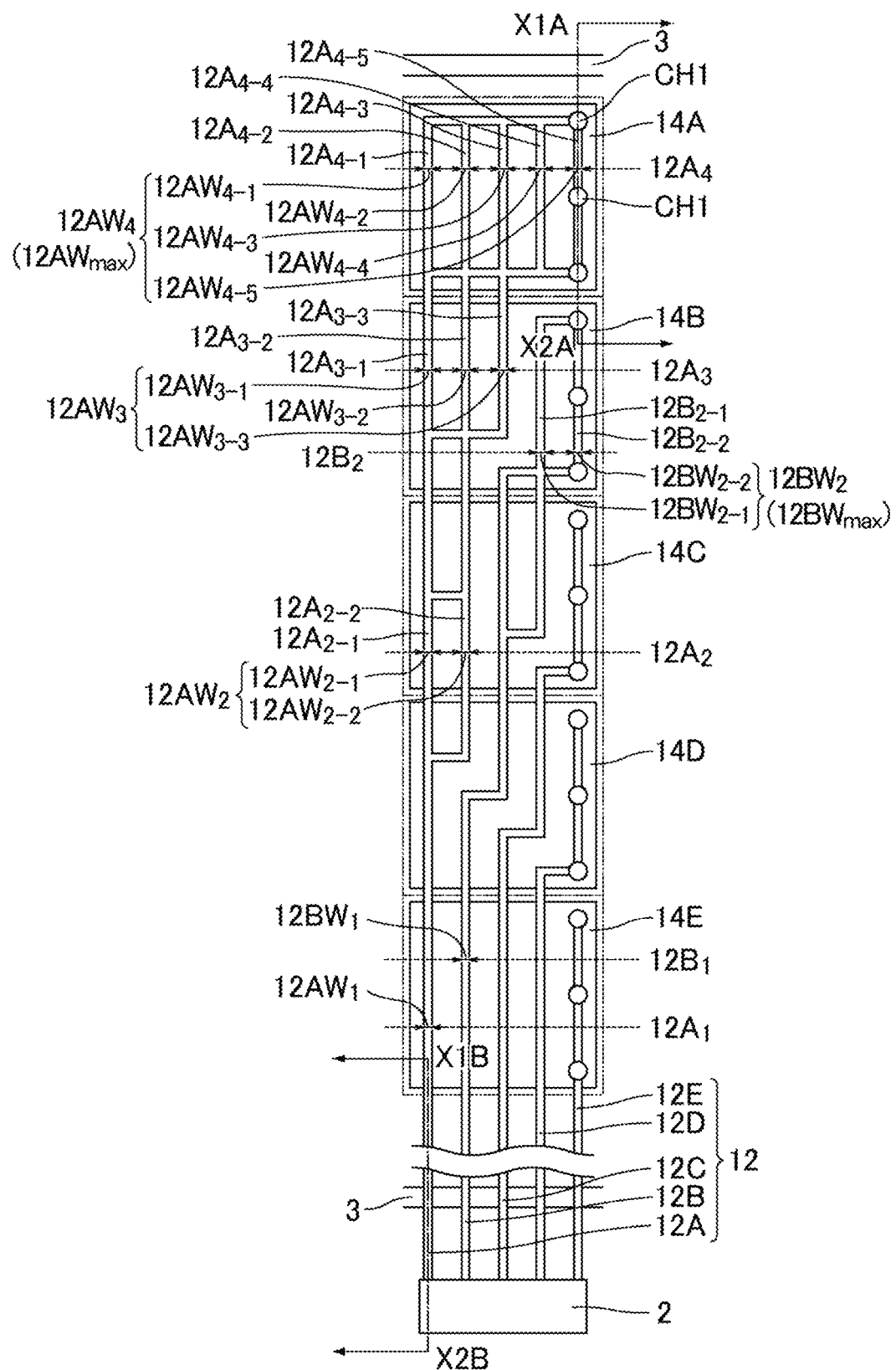
FIG. 3 is an enlarged schematic plan view of the dimming units shown in FIG. 2, being arranged in one direction from the drive circuit.

FIG. 3 is an enlarged schematic plan view of the dimming units shown in FIG. 2, being arranged in one direction from the drive circuit. As shown in FIG. 3, the first dimming electrodes 14A, 14B, 14C, 14D, and 14E are electrically connected to connection lines 12A, 12B, 12C, 12D, and 12E, respectively. FIG. 3 shows an example in which one dimming electrode is electrically connected to one connection line through three contact holes CH1. The number of contact holes for electrically connecting one dimming electrode to one connection line is not limited. The connection lines 12A, 12B, 12C, 12D, and 12E are each connected to the drive circuit 2. The drive circuit 2 may be disposed in a frame region that surrounds the dimming region provided with the dimming units.

For at least one of the connection lines, the electrode width increases in response to an increase in the distance from the drive circuit. If the width of the connection line is constant, the wire resistance of the connection line 12A connected to the dimming electrode 14A increases in response to an increase in the distance from the drive circuit 2. Thereby, the dimming electrode 14A located farther from the drive circuit 2 is less likely to be charged than the dimming electrode 14E located closer to the drive circuit 2. In the present embodiment, the electrode width of at least one of the connection lines increases in response to an increase in the distance from the drive circuit, whereby the wire resistance is reduced. Thus, even in use of a transparent electrode having a high electric resistance, the charging rate of the dimming electrodes can be improved.

The electrode width of a connection line means the electrode width in the direction perpendicular to the direction in which the dimming units connected to one drive circuit 2 are arranged. In the case of including linear electrodes electrically connected to each other, the electrode width means the total of the electrode widths of the linear electrodes. As shown in FIG. 3, in the connection line 12A electrically connected to the dimming electrode 14A, the electrode widths of the four randomly selected sites $12A_1$, $12A_2$, $12A_3$, and $12A_4$, which are sequentially numbered from the drive circuit 2 side, are referred to as electrode widths $12AW_1$, $12AW_2$, $12AW_3$, and $12AW_4$, respectively. The width $12AW_1$ corresponds to the electrode width of one linear electrode. The site $12A_2$ includes two linear electrodes $12A_{2-1}$ and $12A_{2-2}$ whose electrode widths are referred to as $12AW_{2-1}$ and $12AW_{2-2}$, respectively. The electrode width $12AW_2$ at the site $12A_2$ corresponds to the total of two electrode widths, i.e., the electrode widths $12AW_{2-1}$ and $12AW_{2-2}$. Similarly, the electrode width $12AW_3$ at the site $12A_3$ corresponds to the total of three electrode widths, i.e., the electrode widths $12AW_{3-1}$, $12AW_{3-2}$, and $12AW_{3-3}$ of the linear electrodes $12A_{3-1}$, $12A_{3-2}$, and $12A_{3-3}$, respectively. The electrode width $12AW_4$ at the site $12A_4$ corresponds to the total of five electrode widths, i.e., the electrode widths $12AW_{4-1}$, $12AW_{4-2}$, $12AW_{4-3}$, $12AW_{4-4}$, and $12AW_{4-5}$ of the linear electrodes $12A_{4-1}$, $12A_{4-2}$, $12A_{4-3}$, $12A_{4-4}$, and $12A_{4-5}$, respectively. As described for the electrode widths $12AW_1$, $12AW_2$, $12AW_3$, and $12AW_4$ of the connection line 12A, the total electrode width increases in response to an increase in the distance from the drive circuit 2.

Also in the connection line 12B electrically connected to the dimming electrode 14B, the electrode widths of the two randomly selected sites $12B_1$ and $12B_2$, which are sequentially numbered from the drive circuit 2 side, are referred to as electrode widths $12BW_1$ and $12BW_2$, respectively. The width $12BW_1$ corresponds to the electrode width of one linear electrode, and the electrode width $12BW_2$ of the site $12B_2$ corresponds to the total of two electrode widths, i.e., the electrode width $12BW_{2-1}$ of the linear electrode $12B_{2-1}$ and the linear electrode $12BW_{2-2}$ of the linear electrode $12B_{2-2}$. For the electrode widths $12BW_1$ and $12BW_2$ of the connection line 12B, the total electrode width increases in response to an increase in the distance from the drive circuit 2.

Preferably, the maximum value of the electrode width of a connection line connected to a selected dimming electrode is greater than the maximum value of the electrode width of a connection line connected to a dimming electrode located closer to the drive circuit than the selected dimming electrode is. As shown in FIG. 3, the connection line 12A connected to the dimming electrode 14A has a maximum electrode width 12Awmax that corresponds to the total of the widths of five linear electrodes. Meanwhile, the connection line 12B connected to the dimming electrode 14B located closer to the drive circuit 2 than the dimming electrode 14A has a maximum electrode width 12Bwmax that corresponds to the widths of two linear electrodes. In other words, the maximum value 12Awmax of the electrode width of the connection line 12A connected to the dimming electrode 14A is greater than the maximum value 12Bwmax of the electrode width of the connection line 12B connected to the dimming electrode 14B. As the distance between a dimming electrode and the drive circuit becomes greater, the length of the corresponding connection line increases and thereby the wire resistance also increases. Thus, the charging rate is reduced as compared with a dimming electrode located closer to the drive circuit. Fortunately, the above structure can more easily avoid such a low charging rate of the dimming electrode located far from the drive circuit.

FIG. 4 is a schematic plan view of two adjacent first dimming electrodes shown in FIG. 3. FIG. 4 shows an example in which each first dimming electrode has a quadrangular planar shape and is a plane electrode formed for the entire dimming unit except for the contact holes CH1. The first dimming electrode may be a triangular, quadrangular, or hexagonal plane electrode, for example. Examples of the triangular shape include equilateral triangles, isosceles triangles, and right triangles. Examples of the quadrangular shape include squares, rectangles, and lozenges. The first dimming electrode may be formed from a transparent conductive material such as ITO or IZO, for example.

Figure 5A:
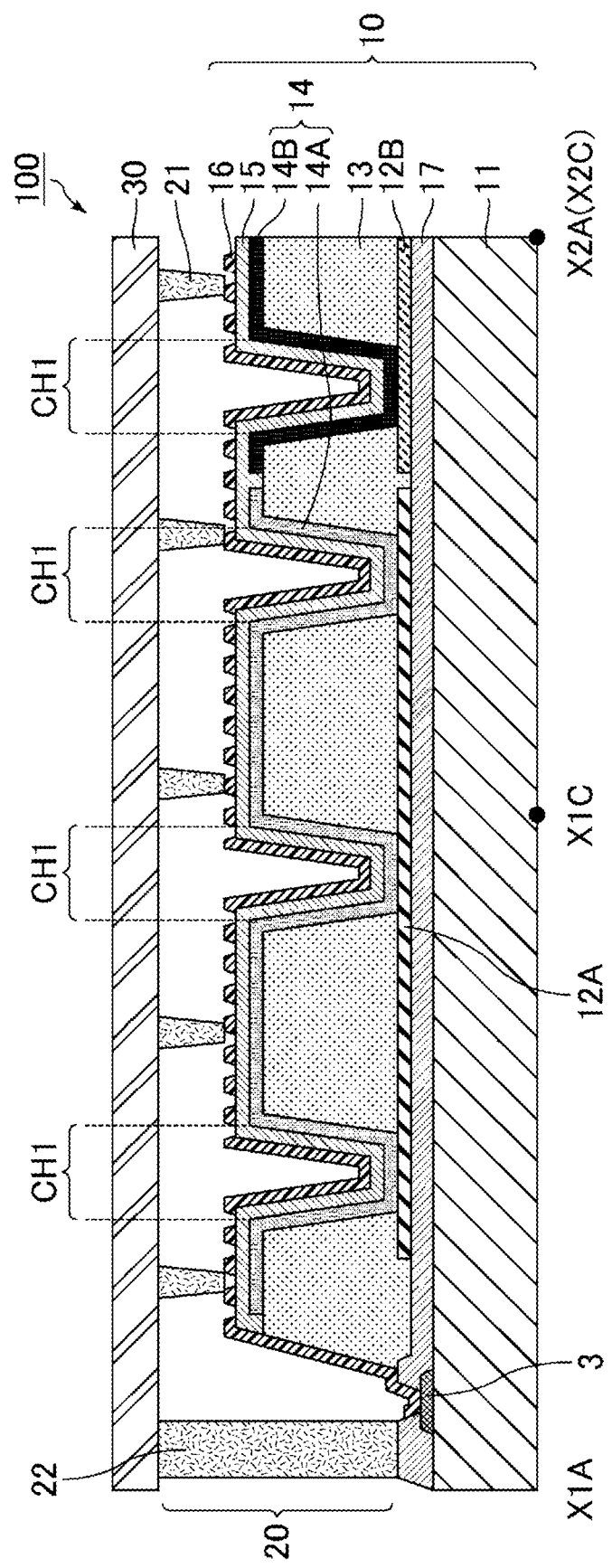
FIG. 5A is a schematic cross-sectional view taken along the line X1A-X2A in FIG. 3.

FIG. 5A is a schematic cross-sectional view taken along the line X1A-X2A in FIG. 3. FIG. 5A is also a schematic cross-sectional view taken along the line X1C-X2C in FIG. 4. As shown in FIG. 5A, the dimming panel 100 sequentially includes a first substrate 10, a liquid crystal layer 20, and a second substrate 30. The first substrate 10 and the second substrate 30 are attached to each other with a sealing material 22 disposed around the dimming region in a plan view as shown in FIG. 2. The first substrate 10 sequentially includes an insulating substrate 11, the connection lines 12 (12A, 12B), a first insulating layer 13, the first electrodes 14 (14A, 14B), a second insulating layer 15, and a second electrode 16. A third insulating layer 17 may be disposed between the insulating substrate 11 and the connection lines 12. The dimming panel 100 is a horizontal alignment mode dimming panel, has excellent viewing angle characteristics, and thus can be suitably used for a large liquid crystal display device requiring high display quality, such as a master monitor.

The insulating substrate 11 and the second substrate 30 are support substrates sandwiching the liquid crystal layer 20 and may each be an insulating substrate such as a glass plate or a plastic plate such as a polycarbonate plate. An alignment film defining the initial alignment azimuth of the liquid crystal molecules may be disposed between the first substrate 10 and the liquid crystal layer 20 and between the second substrate 30 and the liquid crystal layer 20, although such alignment films are not illustrated in the figures.

The first insulating layer 13 may be any layer that can insulate the connection lines 12 from the first electrodes 14. The second insulating layer 15 may be any layer that can insulate the first electrodes 14 from the second electrode 16. The first insulating layer 13, the second insulating layer 15, and the third insulating layer 17 may be formed from a silicon oxide film, a silicon nitride film, or the like.

Figure 5B:
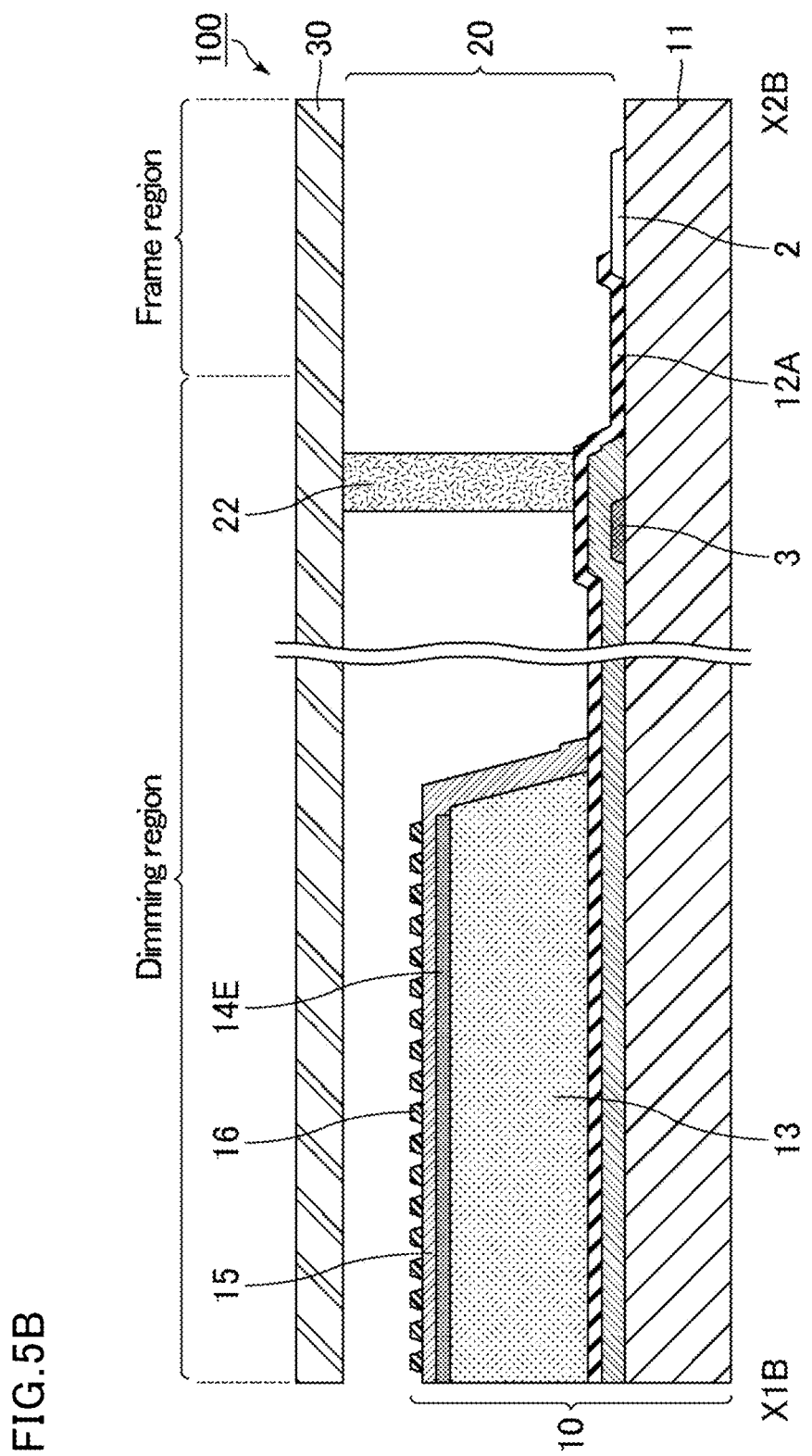
FIG. 5B is a schematic cross-sectional view taken along the line X1B-X2B in FIG. 3.

As shown in FIG. 5A, the first dimming electrode 14A may be electrically connected to the connection line 12A through the contact holes CH1 extending across the first insulating layer 13. The first dimming electrode 14B may be electrically connected to the connection line 12B through different contact holes CH1 extending across the first insulating layer 13. FIG. 5B is a schematic cross-sectional view taken along the line X1B-X2B in FIG. 3. As shown in FIG. 5B, the connection line 12A may be electrically connected to the drive circuit 2 in the frame region located outside the dimming region.

The liquid crystal layer 20 contains liquid crystal molecules. The liquid crystal molecules may have a positive anisotropy of dielectric constant (As) defined by the following formula (positive type) or a negative anisotropy of dielectric constant (As) (negative type). The liquid crystal material used in the liquid crystal layer of the dimming panel 100 may be the same as or different from the liquid crystal material used in the liquid crystal layer of the image-providing liquid crystal panel described later. In order to improve the reliability, the liquid crystal material used in the liquid crystal layer of the dimming panel 100 preferably has better resistance to high temperature and high luminance than the liquid crystal material used in the liquid crystal layer of the image-providing liquid crystal panel. As shown in FIG. 5A, the liquid crystal layer 20 is allowed to have a certain thickness by spacers 21 and to be sealed between the first substrate 10 and the second substrate 30 with the sealing material 22.

$$\Delta\varepsilon = \text{(dielectric constant in major axis direction of liquid crystal molecules)} - \text{(dielectric constant in minor axis direction of liquid crystal molecules)} \quad (L)$$

FIG. 6 is an enlarged schematic plan view showing a part of the second electrode shown in FIG. 5A. As shown in FIG. 6, the second electrode 16 in a plan view may include parallel linear electrodes 16a. A region between the linear electrodes 16a is a slit region 16b. The linear electrodes 16a may be disposed for each dimming unit, or may be disposed in the entire dimming panel regardless of the boundaries of the dimming units. The linear electrodes 16a are preferably formed from a transparent conductive material such as ITO or IZO.

As shown in FIG. 6, when the extending direction of the linear electrodes 16a is defined as D1 and the angle formed by the direction D1 and the absorption axis of one of the first polarizer 41 and the second polarizer 42 sandwiching the dimming panel 100 is defined as θx, the angle θx may be 75° or greater and 85° or smaller.

The following describes a dimming method using the dimming panel. Embodiment 1 describes the case where the drive circuits 2 control the voltages applied to the respective first dimming electrodes and apply a constant voltage to the second electrode 16. As shown in FIG. 5A, the second electrode 16 may be electrically connected to the common line 3 that surrounds the dimming region and a certain reference voltage (common voltage) may be applied to the second electrode. Alternatively, the second electrode 16 may be grounded. When a constant voltage is applied to the second electrode 16 and the drive circuits 2 apply predetermined voltages to the respective first dimming electrodes, an electric field is formed in the liquid crystal layer 20. The second electrode 16 includes parallel linear electrodes 16a. Thus, a fringe electric field is formed between the first dimming electrodes and the linear electrodes 16a and thereby changes the alignment azimuth of liquid crystal molecules in the liquid crystal layer 20. Forming an angle between the alignment azimuth of the liquid crystal molecules and the absorption axis of each linear polarizer enables controlling the amount of light (e.g., backlight illumination) transmitted through the dimming panel for each diming unit and thereby can provide grayscale display.

The dimming panel may be used as a member of a liquid crystal display device and may be disposed between an image-providing liquid crystal panel and a backlight. The dimming panel by itself may be used as an anti-glare panel for controlling the amount of external light transmitted. An example of the anti-glare panel is a vehicle-mounted sun visor.

Embodiment 2

Figure 7:
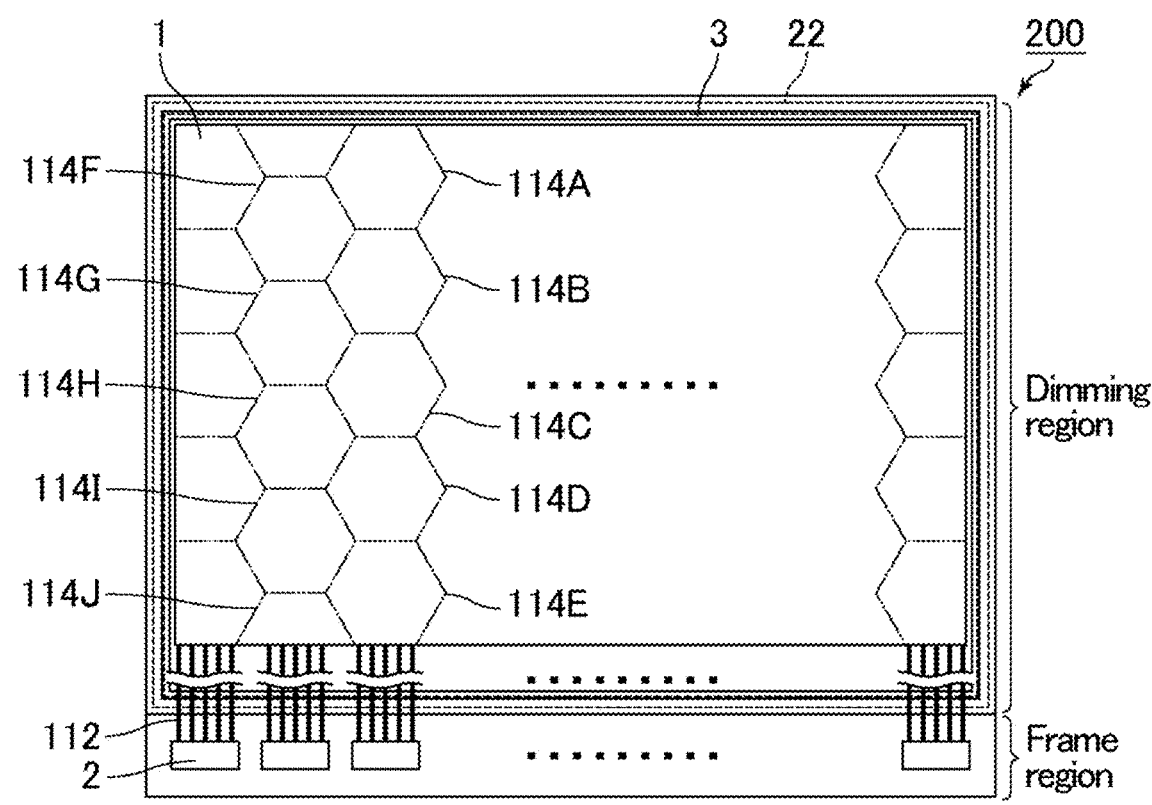
FIG. 7 is a schematic plan view of a dimming panel of Embodiment 2.

A dimming panel 200 of Embodiment 2 has the same structure as that of Embodiment 1, except for the structure of the first electrodes (first dimming electrodes). FIG. 7 is a schematic plan view of a dimming panel of Embodiment 2. The arrangement of the dimming units 1 is shown by the hexagons indicated by the two-dot chain lines. The portions surrounded by the two-dot chain lines each correspond to the portion surrounded by the two-dot chain line shown in the later-described FIG. 10. These portions indicate positioning areas for roughly locating the base electrodes when the first dimming electrodes are arranged in a plane of the dimming panel. As shown in FIG. 7, the dimming panel 200 includes the drive circuits 2 and the dimming units 1 arranged in one direction from the drive circuit 2. In Embodiment 2, the first dimming electrodes 114 are disposed for the respective dimming units 1.

Figure 8:
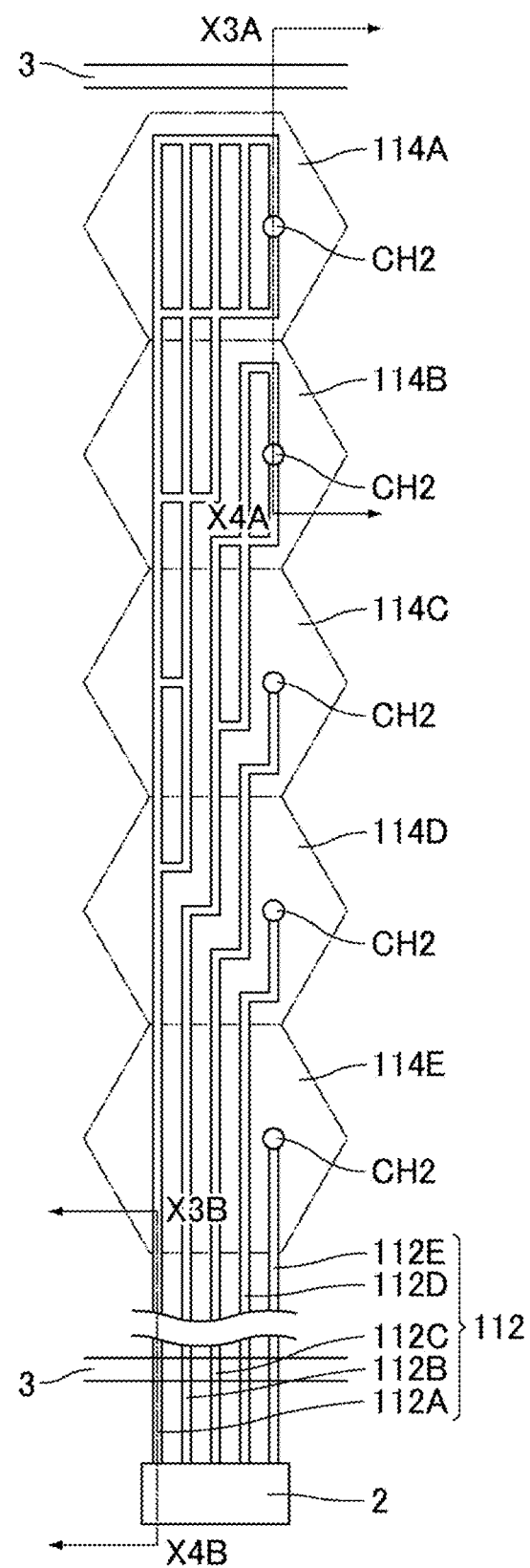
FIG. 8 is an enlarged schematic plan view of the dimming units shown in FIG. 7, being arranged in one direction from the drive circuit.
Figure 9A:
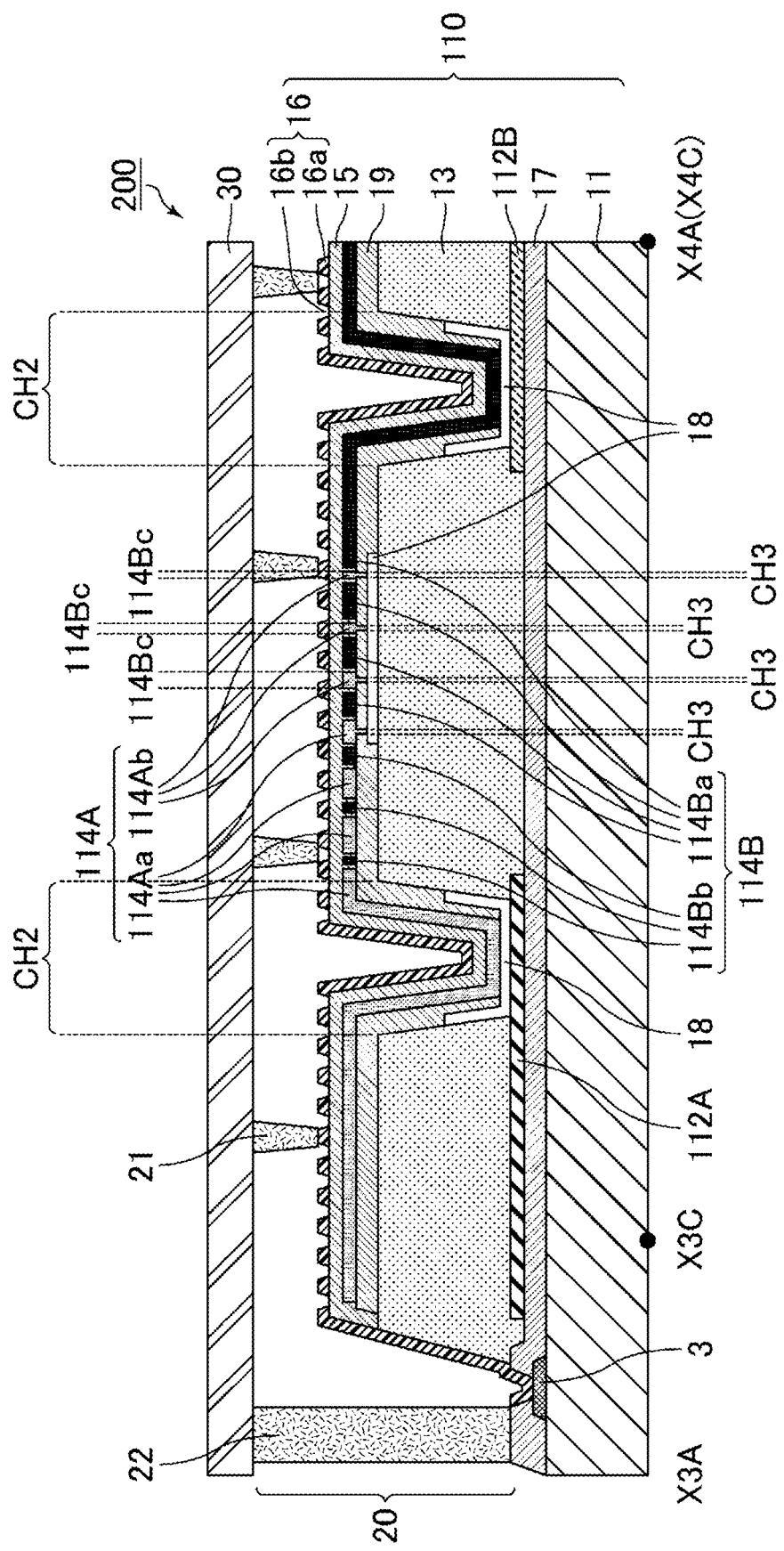
FIG. 9A is a schematic cross-sectional view taken along the line X3A-X4A in FIG. 8.
Figure 9B:
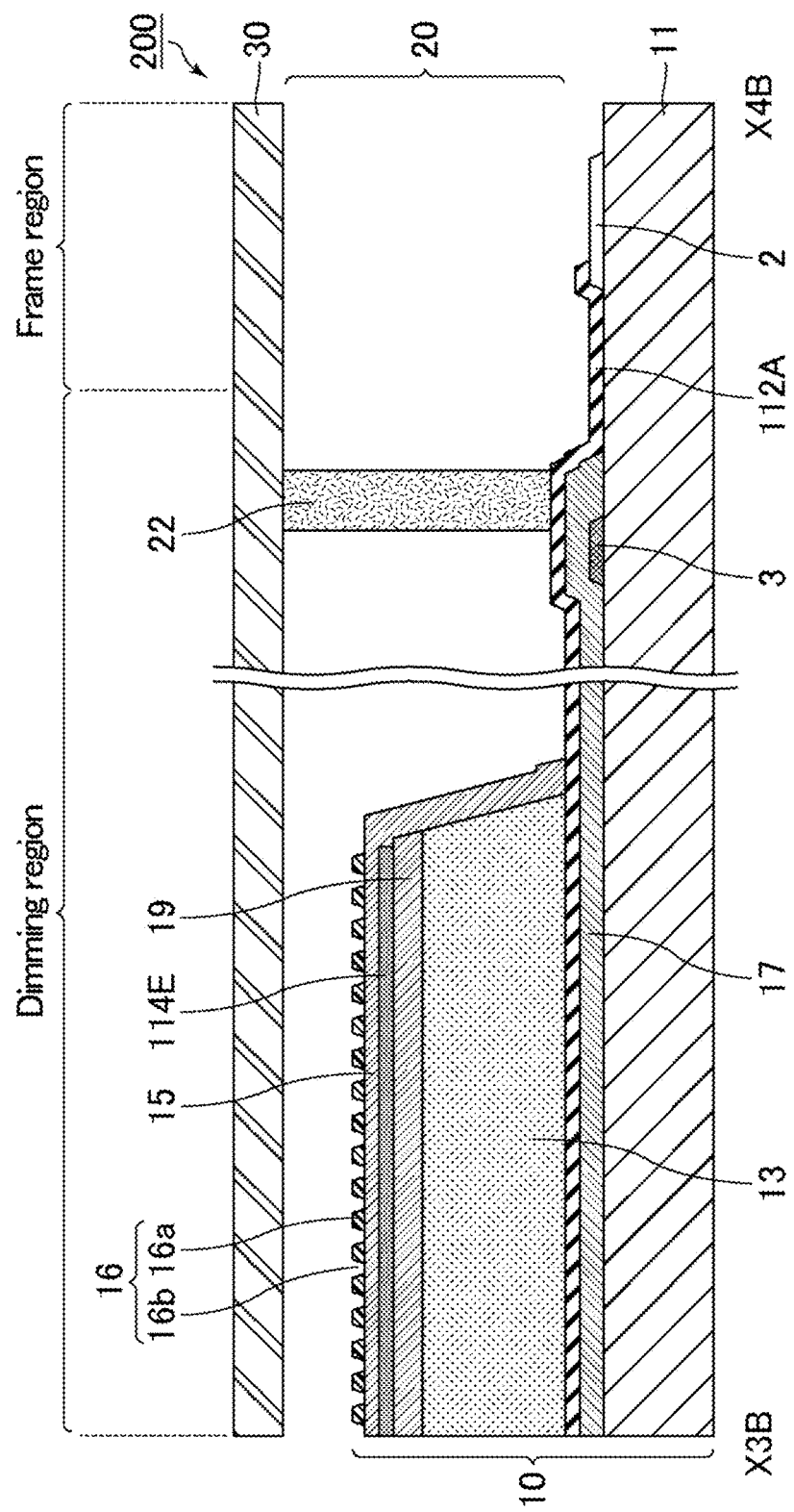
FIG. 9B is a schematic cross-sectional view taken along the line X3B-X4B in FIG. 8.

FIG. 8 is an enlarged schematic plan view of the dimming units shown in FIG. 7, being arranged in one direction from the drive circuit. FIG. 8 simply shows the planer shape of the first dimming electrodes as hexagons. FIG. 9A is a schematic cross-sectional view taken along the line X3A-X4A in FIG. 8. FIG. 9A is also a schematic cross-sectional view taken along the line X3C-X4C in FIG. 11. FIG. 9B is a schematic cross-sectional view taken along the line X3B-X4B in FIG. 8. In Embodiment 2, similarly to Embodiment 1, the electrode width of at least one of the connection lines 112A, 112B, 112C, 112D and 112E increases in response to an increase in the distance from the drive circuit 2 as shown in FIG. 8. The first dimming electrodes 114A, 114B, 114C, 114D, and 114E arranged in the column direction of the dimming panel 200 are respectively electrically connected to the connection lines 112A, 112B, 112C, 112D, and 112E through contact holes CH2. The connection lines 112A, 112B, 112C, 112D, and 112E are each connected to the drive circuit 2. As shown in FIG. 9B, the connection line 112A may be electrically connected to the drive circuit 2 in the frame region.

In the dimming panel 200 of Embodiment 2, preferably, the first substrate 110 further sequentially includes, between the insulating substrate 11 and the first electrodes 114, lower-layer electrodes 18 and a fourth insulating layer 19 from the insulating substrate 11 side. As shown in FIG. 9A, the first substrate 110 may sequentially include the insulating substrate 11, the connection lines 112 (112A and 112B), the first insulating layer 13, the lower-layer electrodes 18, the fourth insulating layer 19, the first dimming electrodes 114 (114A and 114B), the second insulating layer 15, and the second electrode 16. Also, as shown in FIG. 9A, the second electrode 16 may be electrically connected to the common line 3 that surrounds the dimming region. The third insulating layer 17 may be disposed between the insulating substrate 11 and the connection lines 112. The fourth insulating layer 19 may be any layer that can insulate the lower-layer electrodes 18 from the first dimming electrodes 114. The fourth insulating layer 19 may be a silicon oxide film or a silicon nitride film, for example.

Figure 10:
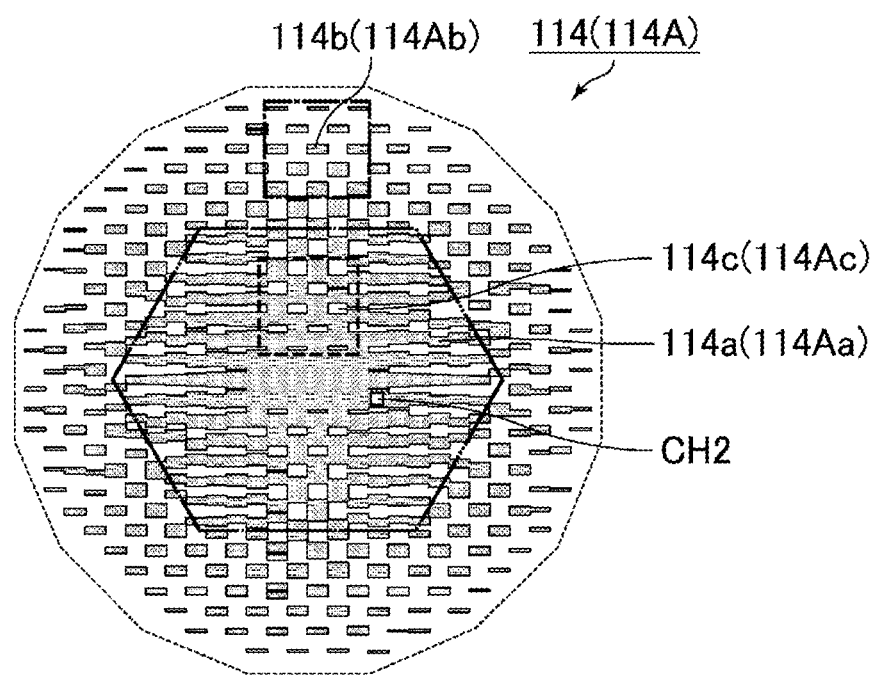
FIG. 10 is a schematic plan view showing one of the first dimming electrodes shown in FIG. 7.

FIG. 10 is a schematic plan view showing one of the first dimming electrodes shown in FIG. 7. As shown in FIG. 10, each first dimming electrode 114 includes island electrodes 114b (114Ab) that are spaced from each other in a plan view and are electrically connected to each other. The present inventors studied to find the following. That is, first dimming electrodes having a certain shape and disposed for the respective dimming units may fail to achieve a smooth luminance distribution between the dimming units. In addition, in providing display with different grayscale values between adjacent dimming units, a difference in luminance may be remarkable between the dimming units to possibly cause the shape of the dimming units to be recognized. Embodiment 2 employs the structure in which each first dimming electrode includes island electrodes that are spaced from each other in a plan view and are electrically connected to each other, and thus achieves a smooth luminance distribution change between adjacent dimming units.

In Embodiment 2, a structure in which a constant voltage is applied to the second electrode provided with linear electrodes and predetermined voltages are applied to the first dimming electrodes disposed for the respective dimming units eliminates the need for providing linear electrodes for forming a fringe electric field in the first dimming electrodes and thus allows the first electrodes to have any electrode shape as long as an electric field can be formed with the second electrode. Accordingly, the first electrodes (first dimming electrodes) can have a complicated electrode shape such as a shape including multiple island electrodes.

Each first dimming electrode 114 may further include a base electrode 114a (114Aa) provided with apertures 114c (114Ac). The base electrode 114a may be disposed in the center of a dimming unit or may be disposed such that the center of the base electrode 114a comes to the center of the first dimming electrode 114. FIG. 10 shows the case where at least one of the island electrodes 114b has a quadrangular planer shape and at least one of the apertures 114c also has a quadrangular peripheral shape.

The island electrodes 114b may surround a base electrode 114a in a plan view. The island electrodes 114b arranged so as to surround the base electrode 114a in a plan view can control the spreading of light transmitted through each dimming unit.

The planar shape of at least one island electrode 114b may include a linear portion and may be, for example, a shape such as a quadrangle including a rectangle, a square, and a rhombus. The planar shape of at least one island electrode 114b may include a curved portion and may be, for example, a shape such as a circle or an ellipse. Furthermore, the planar shape of at least one island electrode 114b may have a shape formed by a combination of a linear portion and a curved portion. The planar shape of at least one island electrode 114b may be designed according to the planar shape of the pixels constituting the later-described image-providing liquid crystal panel.

The outer peripheral shape (planar peripheral shape in a plan view) of at least one aperture 114c may be any shape that can contain at least one island electrode 114b. The outer peripheral shape of at least one aperture 114c may include a linear portion and may be, for example, a shape such as a quadrangle including a rectangle, a square, and a rhombus. The outer peripheral shape of at least one aperture 114c may include a curved portion and may be, for example, a shape such as a circle or an ellipse. Furthermore, the outer peripheral shape of at least one aperture 114c may have a shape formed by a combination of a linear portion and a curved portion. The outer peripheral shape of at least one aperture 114c may be designed according to the planar shape of pixels constituting the image-providing liquid crystal panel described later.

In FIG. 10 and the later-described FIG. 11, the portions surrounded by two-dot chain lines indicate positioning areas for roughly locating the base electrodes 114a when the first dimming electrodes 114 are arranged in a plane of the dimming panel 200. The outer peripheral shape of the positioning area may be different from the outer peripheral shape of the base electrode 114a. The outer peripheral shape of the positioning area is preferably a shape that allows tidy arrangement of a plurality of the shapes on a flat surface. The outer peripheral shape of the positioning area may be a shape such as a triangle, a quadrangle, or a hexagon. Examples of the triangle include equilateral triangles, isosceles triangles, and right triangles. Examples of the quadrangle include squares, rectangles, and rhombuses. In order to achieve a smoother change in luminance distribution, the outer peripheral shape of the positioning area is preferably a regular polygon, and an equilateral triangle, a square, a regular hexagon, or the like is suitable.

The island electrodes 114b may be arranged in a manner that the electrode area concentrically decreases from the center of the base electrode 114a toward the outer periphery of the first electrode 114. The apertures 114c may be arranged in a manner that the aperture area concentrically increases from the center of the base electrode 114a toward the outer periphery of the first electrode 114. The outer periphery of the base electrode 114a may not be a linear periphery and may have an irregular portion.

The island electrodes 114b may be arranged in a manner that the electrode area occupancy decreases toward the outer periphery of the first dimming electrode 114. The electrode area occupancy refers to the proportion of the total electrode area of island electrodes 114b in a predetermined unit area in one dimming unit. The arrangement of the island electrodes 114b in a manner that the electrode area occupancy thereof decreases toward the outer periphery of the first dimming electrode 114 in a plan view allows the center portion of the first dimming electrode 114 to have the highest luminance and allows the luminance to moderately decrease toward the outer periphery. The electrode area occupancy may be decreased by arranging the island electrodes 114b in a manner that the electrode area decreases toward the outer periphery of the first dimming electrode 114 or by reducing the number of island electrodes 114b toward the outer periphery of the first dimming electrode 114. The outer periphery of the first dimming electrode 114 corresponds to a line connecting the island electrodes 114b disposed at the farthest positions from the center of the first dimming electrode 114 in a plan view.

The apertures provided in the base electrode 114a may be arranged in a manner that the aperture area occupancy increases from the center of the base electrode 114a (the center of the first dimming electrode 114) toward the outer periphery thereof. The aperture area occupancy means the proportion of the total aperture area of the apertures in a predetermined unit area in one dimming unit.

Figure 11:
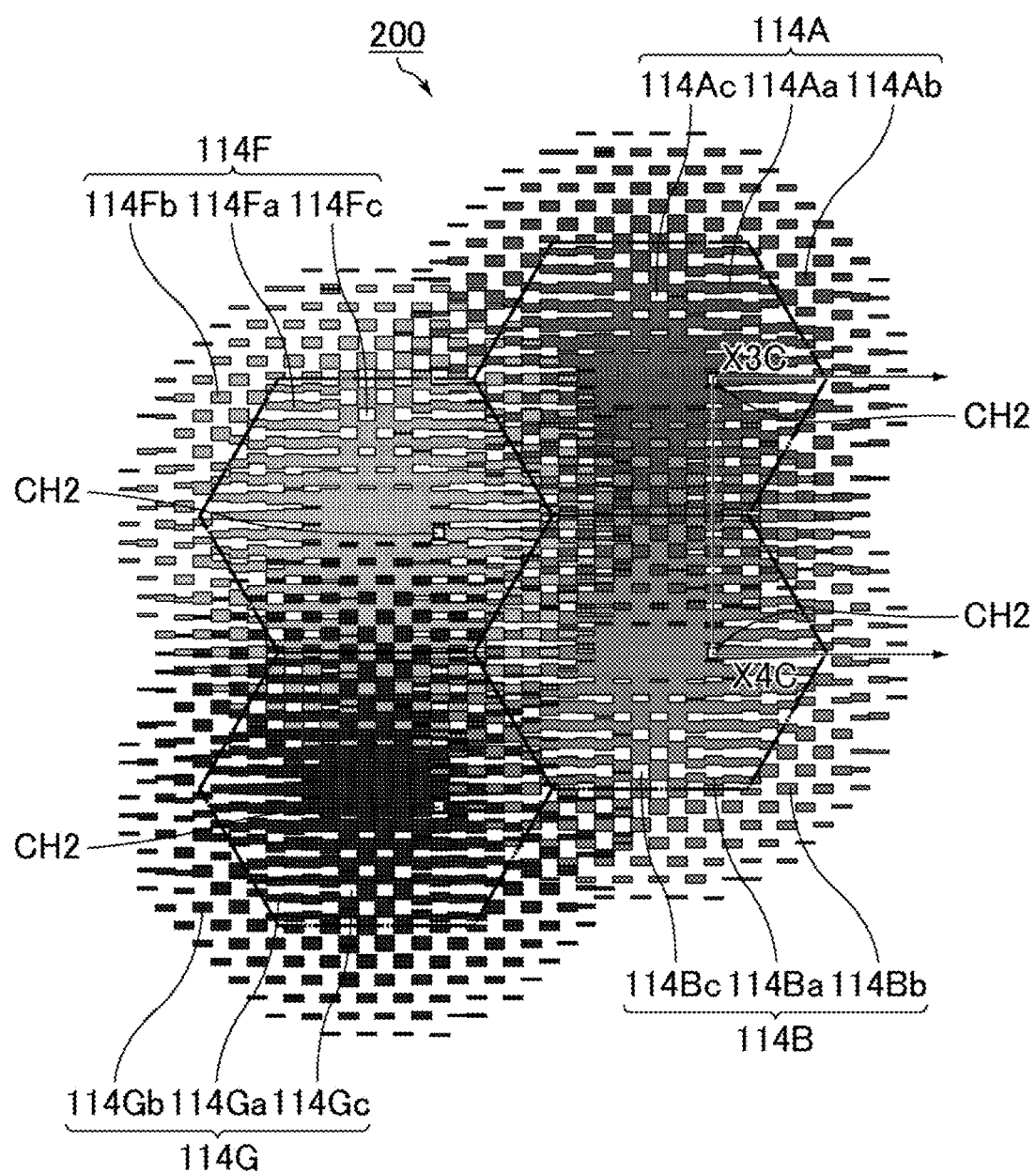
FIG. 11 is a schematic plan view of four adjacent first dimming electrodes shown in FIG. 7.

FIG. 11 is a schematic plan view of four adjacent first dimming electrodes shown in FIG. 7. FIG. 11 describes the case where the peripheral shape of each positioning area is a hexagon. In the case where the outer peripheral shape of the positioning areas is a hexagon, one first dimming electrode is adjacent to six other first dimming electrodes with its six sides as boundaries. The arrangement of three first dimming electrodes 114A, 114F, and 114G among the six other first dimming electrodes adjacent to the first dimming electrode 114B is described with reference to FIG. 11. The first electrodes 114B, 114F, and 114G respectively include the base electrodes 114Ba, 114Fa, and 114Ga and multiple island electrodes 114Bb, 114Fb, and 114Gb that respectively surround the base electrodes 114Ba, 114Fa, and 114Ga in a plan view. The base electrodes 114Ba, 114Fa, and 114Ga are respectively provided with multiple apertures 114Bc, 114Fc, and 114Gc.

As shown in FIG. 11, when two adjacent first dimming electrodes 114A and 114B are focused on, at least one island electrode 114Ab of the first dimming electrode 114A may be disposed between island electrodes 114Bb of the first dimming electrode 114B, and at least one island electrode 114Bb of the first dimming electrode 114B may be disposed between island electrodes 114Ab of the first dimming electrode 114A. Such an arrangement can smooth the change in luminance distribution between the adjacent first dimming electrodes to allow the boundaries between dimming units to be less recognizable. In other words, the region provided with the first dimming electrode 114A overlaps the region provided with the first dimming electrode 114B.

The island electrodes are spaced from each other in a plan view. Thus, part of the island electrodes 114Ab of the first dimming electrode 114A can be disposed between island electrodes 114Bb of the first dimming electrode 114B. Similarly, part of the island electrodes 114Bb can be disposed between island electrodes 114Ab. The island electrodes 114Ab may be arranged in a manner that the electrode area occupancy decreases from the center of the first dimming electrode 114A toward the center of the first dimming electrode 114B, and the island electrodes 114Bb may be arranged in a manner that the electrode area occupancy decreases from the center of the first dimming electrode 114B toward the center of the first dimming electrode 114A. Specifically, the island electrodes 114Ab may be arranged in a manner that the electrode area or the number of electrodes decreases from the center of the first dimming electrode 114A toward the center of the first dimming electrode 114B, and the island electrodes 114Bb may be arranged in a manner that the electrode area or the number of electrodes decreases from the center of the first dimming electrode 114B toward the center of the first dimming electrode 114A.

The apertures 114Ac provided in the base electrode 114Aa of the first dimming electrode 114A may be arranged in a manner that the aperture area occupancy increases from the center of the first dimming electrode 114A toward the center of the first dimming electrode 114B, and the apertures 114Bc provided in the base electrode 114Ba of the first dimming electrode 114B may be arranged in a manner that the aperture area occupancy increases from the center of the first dimming electrode 114B toward the center of the first dimming electrode 114A. Specifically, the apertures 114Ac may be arranged in a manner that the aperture area or the number of apertures increases from the center of the first dimming electrode 114A toward the center of the first dimming electrode 114B, and the apertures 114Bc may be arranged in a manner that the aperture area or the number of apertures increases from the center of the first dimming electrode 114B toward the center of the first dimming electrode 114A.

With the structure in which the base electrodes 114Aa and 114Ba are provided with the apertures 114Ac and the apertures 114Bc, respectively, at least one island electrode 114Ab of the first dimming electrode 114A can be disposed inside at least one aperture 114Bc provided in the base electrode 114Ba of the adjacent first dimming electrode 114B. Similarly, at least one island electrode 114Bb of the first dimming electrode 114B can be disposed inside at least one aperture 114Ac in the base electrode 114Aa of the adjacent first dimming electrode 114A.

At least one island electrode 114Ab of the first dimming electrode 114A may be disposed inside at least one aperture 114Bc and between island electrodes 114Bb, or may be disposed inside at least one aperture 114Bc or between island electrodes 114Bb of the first dimming electrode 114B. Similarly, at least one island electrode 114Bb of the first dimming electrode 114B may be disposed inside at least one aperture 114Ac and between island electrodes 114Ab, or may be disposed inside at least one aperture 114Ac or between island electrodes 114Ab of the first dimming electrode 114A.

At least one island electrode is preferably electrically connected to the lower-layer electrode through contact hole(s). As shown in FIG. 9A, at least one island electrode 114Ab is preferably electrically connected to the lower-layer electrode 18 through contact hole(s) CH3 extending across the fourth insulating layer 19. The island electrodes 114Ab in a plan view seem to be scattered with spaces therebetween. In fact, they are electrically connected by the lower-layer electrode 18. Accordingly, the same voltage can be applied to the island electrodes 114Ab of one first dimming electrode. Although not being illustrated, at least one island electrode 114Bb may be electrically connected to a different lower-layer electrode 18 through different contact hole(s) CH3 extending across the fourth insulating layer 19.

At least one island electrode and the base electrode may be electrically connected via the lower-layer electrode. As shown in FIG. 9A, at least one island electrode 114Ab is preferably electrically connected to the lower-layer electrode 18 through contact hole(s) CH3 extending across the fourth insulating layer 19, and the base electrode 114Aa may be electrically connected to the lower-layer electrode 18 through different contact hole(s) CH4 extending across the fourth insulating layer 19. Although not being illustrated, at least one island electrode 114Bb may be electrically connected to a different lower-layer electrode 18 through contact hole(s) CH3 extending across the fourth insulating layer 19, and the base electrode 114Ba may be electrically connected to the different lower-layer electrode 18 through different contact hole(s) CH4 extending across the fourth insulating layer 19.

The first dimming electrode 114A (the base electrode 114Aa in FIG. 9A) may be electrically connected to the connection line 112A through the contact hole CH2 extending across the first insulating layer 13 and the fourth insulating layer 19. Similarly, the first dimming electrode 114B (base electrode 114Ba in FIG. 9A) may be electrically connected to the connection line 112B through a different contact hole CH2 extending across the first insulating layer 13 and the fourth insulating layer 19. In the contact holes CH2, the lower-layer electrodes 18 may be disposed in a portion where the first dimming electrode 114A and the connection line 112A are connected and in a portion where the first dimming electrode 114B and the connection line 112B are connected. FIG. 9A shows the case where the base electrodes 114Aa and 114Ba are electrically connected to the connection lines 112A and 112B, respectively, through different contact holes CH2. Alternatively, at least one island electrode 114Ab and at least one island electrode 114Ba may be electrically connected to the connection lines 112A and 112B, respectively.

Figure 12:
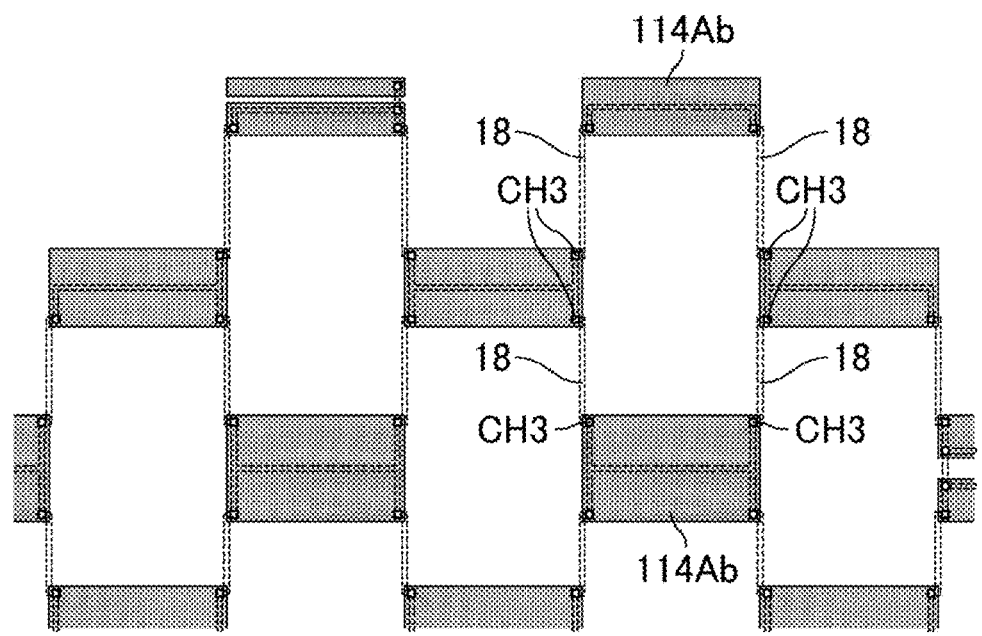
FIG. 12 is a partially enlarged schematic plan view of an example of island electrodes shown in FIG. 10.
Figure 13:
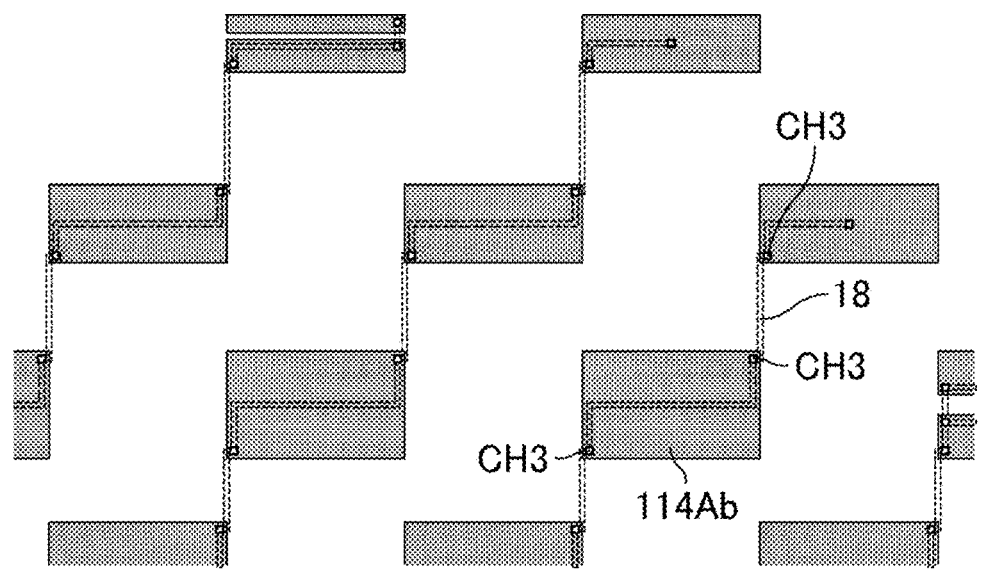
FIG. 13 is a partially enlarged schematic plan view of another example of island electrodes shown in FIG. 10.

FIG. 12 is a partially enlarged schematic plan view of an example of island electrodes shown in FIG. 10. FIG. 13 is a partially enlarged schematic plan view of another example of island electrodes shown in FIG. 10. FIG. 12 and FIG. 13 are each a partially enlarged schematic plan view showing a part of the island electrodes surrounded by the one-dot chain line in FIG. 10. In FIG. 12 and FIG. 13, the lower-layer electrodes 18 disposed in a layer below the island electrodes 114Ab are shown by dotted lines, and contact holes CH3 where the island electrodes 114Ab and the lower-layer electrodes 18 are connected are shown by white squares. The lower-layer electrodes 18 may overlap the boundaries of pixels 60 constituting the later-described image-providing liquid crystal panel 600. For example, the island electrodes 114Ab may be connected in the raw and column directions by the lower-layer electrodes 18 that are disposed in a mesh pattern and overlap the boundaries between the pixels as shown in FIG. 12, or may be connected in a diagonal direction by the lower-layer electrodes 18 that are disposed in the diagonal direction and overlap the boundaries between the pixels as shown in FIG. 13.

One lower-layer electrode 18 in a plan view may overlap the boundary between the first dimming electrode 114A and the first dimming electrode 114B along the boundary therebetween. Studies by the present inventors revealed that in display with a horizontally aligned dimming panel, liquid crystal molecules possibly have an alignment defect at the boundaries between dimming units and thereby cause dark lines. Appearance of such dark lines emphasizes the boundaries between dimming units, and thereby not only may reduce the display quality of the dimming panel but also may reduce the transmittance of the dimming panel. The structure in which the lower-layer electrode 18 overlaps a boundary between the first dimming electrode 114A and the first dimming electrode 114B along the boundary therebetween can reduce or prevent the occurrence of a dark line between adjacent first dimming electrodes.

Figure 14:
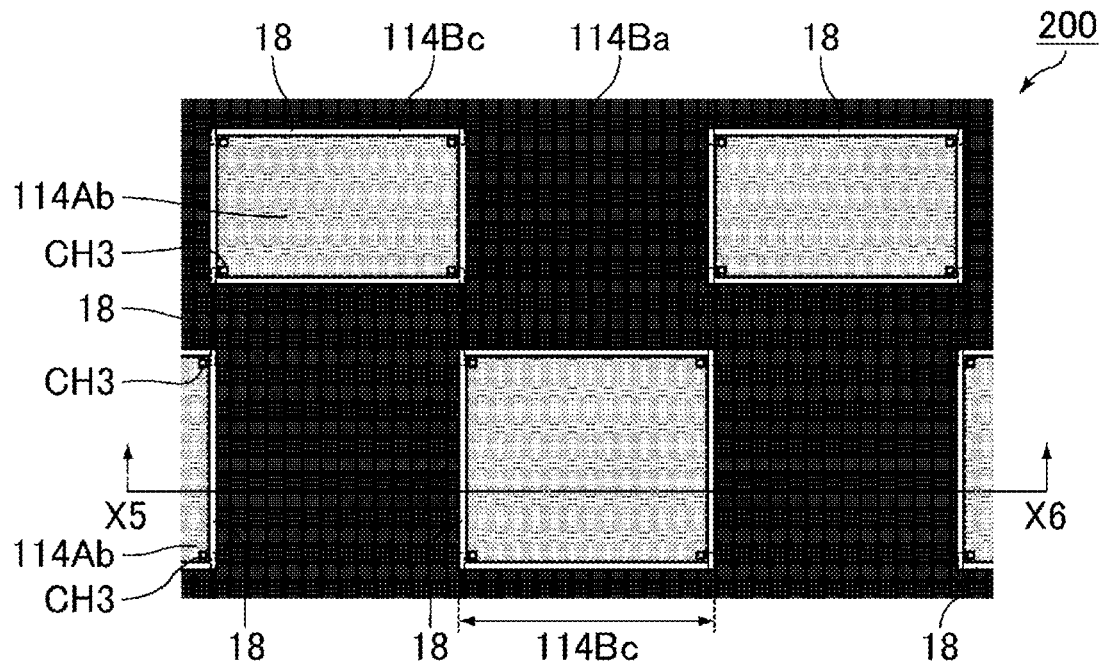
FIG. 14 is a schematic plan view of a first substrate of the dimming panel of Embodiment 2, showing an arrangement example of lower-layer electrodes.
Figure 15:
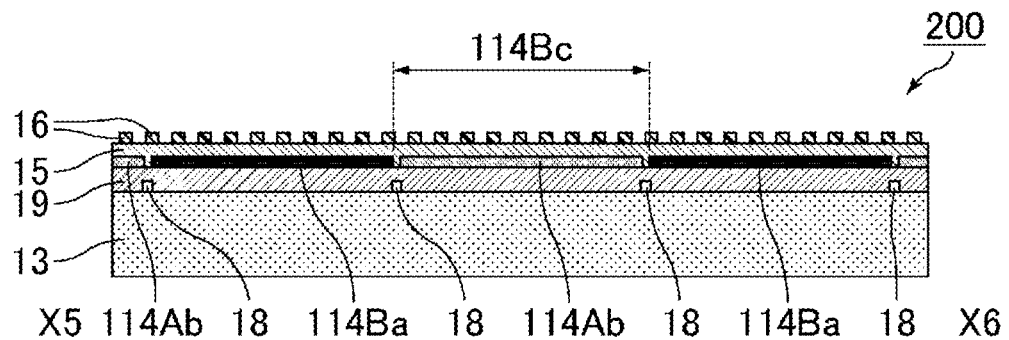
FIG. 15 is a schematic cross-sectional view taken along the line X5-X6 in FIG. 14.

FIG. 14 is a schematic plan view of a first substrate of the dimming panel of Embodiment 2, showing an arrangement example of lower-layer electrodes. FIG. 15 is a schematic cross-sectional view taken along the line X5-X6 in FIG. 14. For example, as shown in FIG. 14 and FIG. 15, one lower-layer electrode 18 in a plan view may overlap a space between one aperture 114Bc provided in the base electrode 114Ba of the first dimming electrode 114B and one island electrode 114Ab of the first dimming electrode 114A. The lower-layer electrode 18 may be disposed in a cyclic manner along the periphery of the island electrode 114Ab. Although not being illustrated, one lower-layer electrode 18 in a plan view may overlap a space between one island electrode 114Ab of the first dimming electrode 114A and one island electrode 114Bb of the first dimming electrode 114B.

Figure 16:
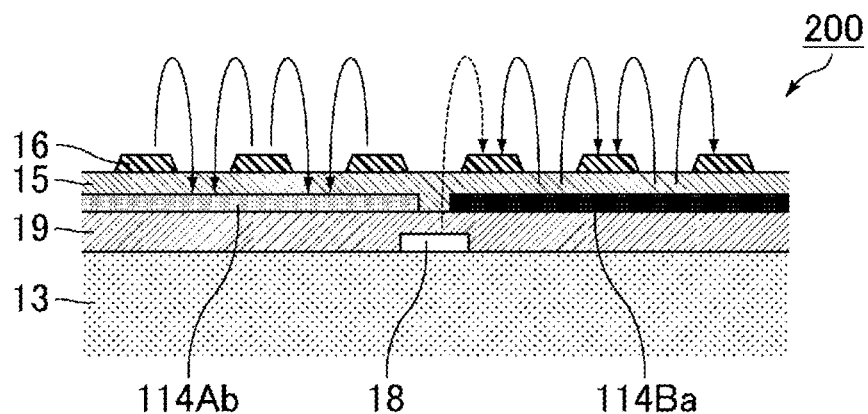
FIG. 16 is a partially enlarged schematic cross-sectional view of FIG. 15.

FIG. 16 is a partially enlarged schematic cross-sectional view of FIG. 15. In a boundary portion between the first dimming electrode 114A and the first dimming electrode 114B, the liquid crystal molecules receive influence from both an electric field formed between the first dimming electrode 114A and the aforementioned second electrode 16 and an electric field formed between the first dimming electrode 114B and the second electrode 16, and are thereby less likely to move to cause alignment defect possibly recognized as a dark line. Therefore, as shown in FIG. 16, the lower-layer electrode 18 is disposed so as to overlap each boundary portion between the first dimming electrode 114A and the first dimming electrode 114B in a plan view. Thereby, an electric field is formed between the lower-layer electrode 18 and the second electrode 16 to change the alignment of the liquid crystal molecules in the boundary portion between the first dimming electrode 114A and the first dimming electrode 114B, whereby occurrence of a dark line can be reduced or prevented. As a result, a reduction in display quality caused by dark lines at the boundaries of the first dimming electrodes can be reduced or prevented, whereby the luminance of the dimming panel can be enhanced.

Embodiment 3

Hereinafter, a dimming panel 300 of Embodiment 3 is described with reference to FIG. 17 and FIG. 18. The dimming panel 300 of Embodiment 3 is a modified example of Embodiment 2 and has the same structure as that of Embodiment 2 except for some features such as the arrangement of the island electrodes, the arrangement of the apertures, and the shape of the base electrodes, of the first dimming electrodes. Thus, descriptions for the similar features are omitted here. A schematic plan view of the dimming panel 300 of Embodiment 3 is similar to FIG. 2, an enlarged schematic plan view of dimming units arranged in one direction from the drive circuit is similar to FIG. 3, and schematic cross-sectional views thereof are similar to FIG. 9A and FIG. 9B. Accordingly, these descriptions are not given. In FIG. 2 and FIG. 3, the portions surrounded by the two-dot chain lines correspond to positioning areas for locating the first dimming electrodes.

Figure 17:
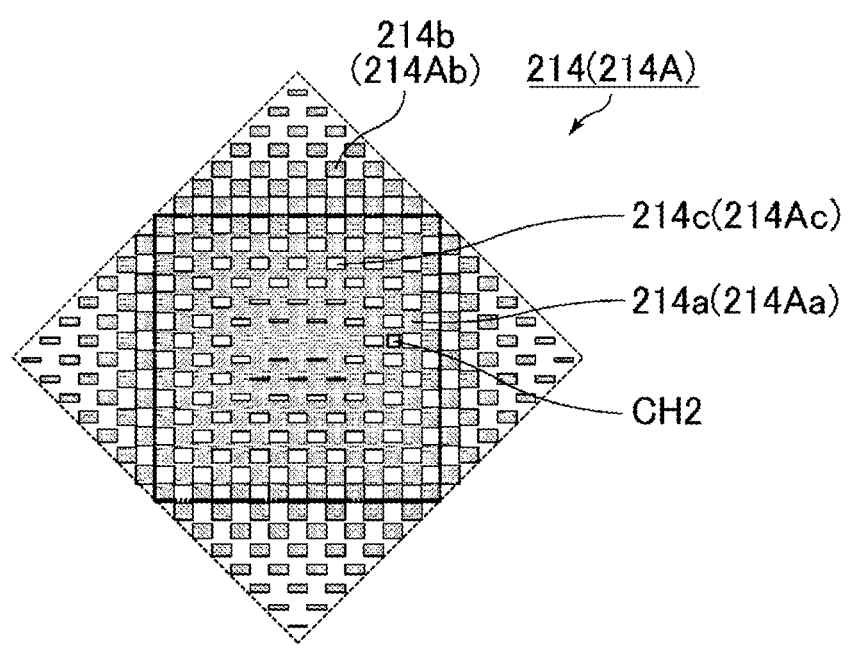
FIG. 17 is a schematic plan view of one first dimming electrode used in a dimming panel of Embodiment 3.

FIG. 17 is a schematic plan view of one first dimming electrode used in the dimming panel of Embodiment 3. In FIG. 17 and the later-described FIG. 18, portions surrounded by two-dot chain lines indicate positioning areas for locating the first dimming electrodes. As shown in FIG. 17, the outer peripheral shape of the positioning areas for locating the first dimming electrodes in Embodiment 3 is a quadrangle (square). Each base electrode 214a is provided with apertures 214c (214Ac). Multiple island electrodes 214b (214Ab) surround the base electrode 214a in a plan view. The island electrodes 114Ab are arranged to form concentric squares from the center of the base electrode 114Aa toward the periphery of the first dimming electrode 114A. The island electrodes 214b are arranged in a manner that the electrode area decreases from the center of the base electrode 214a toward the outer periphery of the first dimming electrode 214. The apertures 214c are arranged in a manner that the aperture area increases from the center of the base electrode 214a toward the outer periphery of the first dimming electrode 214. Embodiment 3 describes the case where the planar shape of at least one island electrode 214b is a quadrangle and the peripheral shape of at least one aperture 214c is also a quadrangle.

In the dimming panel 300 of Embodiment 3, the outer peripheral shape of the positioning areas of Embodiment 3 is a quadrangle. Thus, one first dimming electrode 214A is adjacent to four other first dimming electrodes with its four sides as boundaries. FIG. 18 is a schematic plan view of the dimming panel, showing four adjacent first dimming electrodes each having the structure shown in FIG. 17. The arrangement of two first dimming electrodes 214B and 214F among the four other first dimming electrodes adjacent to the first dimming electrode 214A, and the first dimming electrode 214G diagonal to the first dimming electrode 214A is described with reference to FIG. 18. As shown in FIG. 18, the first dimming electrodes 214A, 214B, 214F, and 214G respectively include the base electrodes 214Aa, 214Ba, 214Fa, and 214Ga and multiple island electrodes 214Ab, 214Bb, 214Fb, and 214Gb that respectively surround the base electrodes 214Aa, 214Ba, 214Fa, and 214Ga in a plan view. In FIG. 18, the portions surrounded by two-dot chain lines are base electrodes. The base electrodes 214Aa, 214Ba, 214Fa, and 214Ga are respectively provided with multiple apertures 214Ac, 214Bc, 214Fc, and 214Gc.

Figure 18:
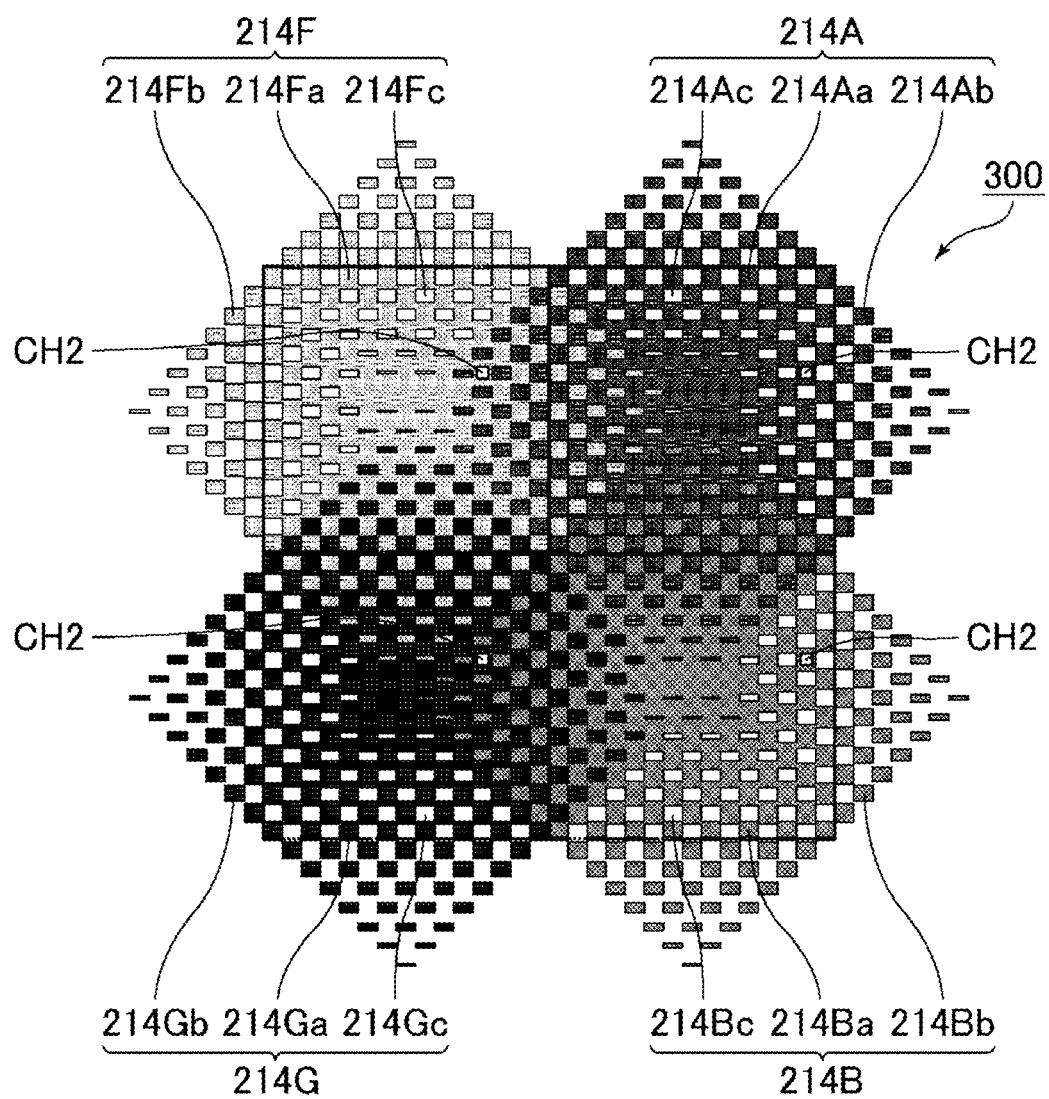
FIG. 18 is a schematic plan view of the dimming panel, showing four adjacent first dimming electrodes each having the structure shown in FIG. 17.

As shown in FIG. 18, at least one island electrode 214Ab of the first dimming electrode 214A is disposed inside at least one aperture 214Bc provided in the base electrode 214Ba of the first dimming electrode 214B that is adjacent to the first electrode 214A in the up/down direction, and at least one island electrode 214Ab is disposed inside at least one aperture 214Fc provided in the base electrode 214Fa of the first dimming electrode 214F that is adjacent to the first dimming electrode 214A in the left/right direction. Also, at least one island electrode 214Bb of the first dimming electrode 214B is disposed inside at least one aperture 214Ac provided in the base electrode 214Aa of the first dimming electrode 214A, and at least one island electrode 214Fb of the first dimming electrode 214F is disposed inside at least one aperture 214Ac provided in the base electrode 214Aa of the first dimming electrode 214A.

Embodiment 4

Hereinafter, a dimming panel 400 of Embodiment 4 is described with reference to FIG. 19 to FIG. 24. The dimming panel 400 of Embodiment 4 is a modified example of Embodiment 2 and has the same structure as that of Embodiment 2 except for some features such as the planar shape and arrangement of the island electrodes, the peripheral shape and arrangement of the apertures, and the shape of the base electrode, of the first dimming electrodes. Thus, descriptions for the similar features are omitted here. A schematic plan view of the dimming panel 400 of Embodiment 4 is similar to FIG. 2, an enlarged schematic plan view of dimming units arranged in one direction from the drive circuit is similar to FIG. 3, and schematic cross-sectional views thereof are similar to FIG. 9A and FIG. 9B. Accordingly, these descriptions are not given. In FIG. 2 and FIG. 3, the portions surrounded by the two-dot chain lines correspond to positioning areas for locating the first dimming electrodes.

Figure 19:
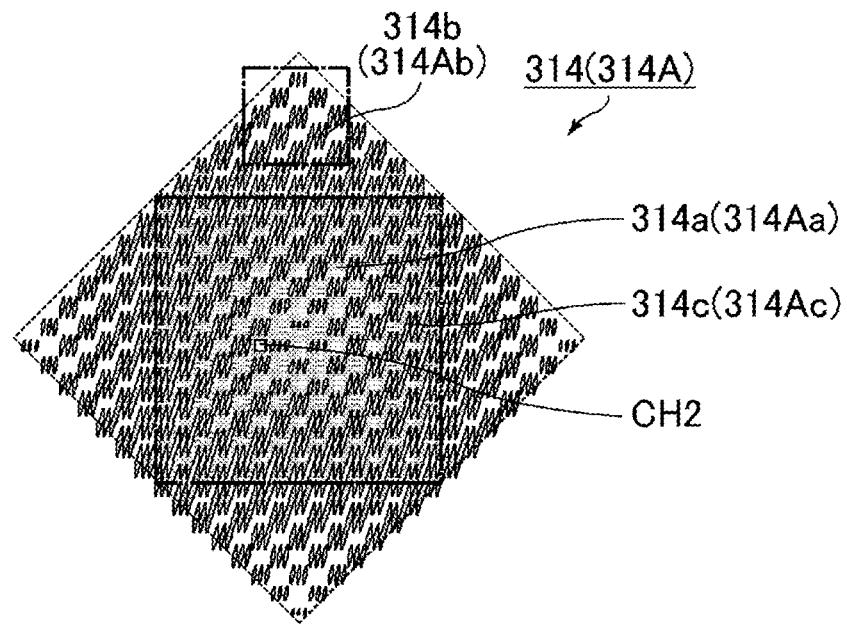
FIG. 19 is a schematic plan view of one first dimming electrode used in a dimming panel of Embodiment 7.

FIG. 19 is a schematic plan view of one first dimming electrode used in a dimming panel of Embodiment 4. In FIG. 19 and the later-described FIG. 21, portions surrounded by one-dot chain lines indicate base electrodes. As shown in FIG. 19, the outer peripheral shape of the positioning areas for locating the first dimming electrodes in Embodiment 4 is a quadrangle (square). Each base electrode 314a is provided with apertures 314c (314Ac). Multiple island electrodes 314b (314Ab) surround the base electrode 314a in a plan view. The island electrodes 314b are arranged in a manner that the electrode area decreases from the center of the base electrode 314a toward the outer periphery of the first dimming electrode 314. The apertures 314c are arranged in a manner that the aperture area increases from the center of the base electrode 314a toward the outer periphery of the first dimming electrode 314.

Figure 20:
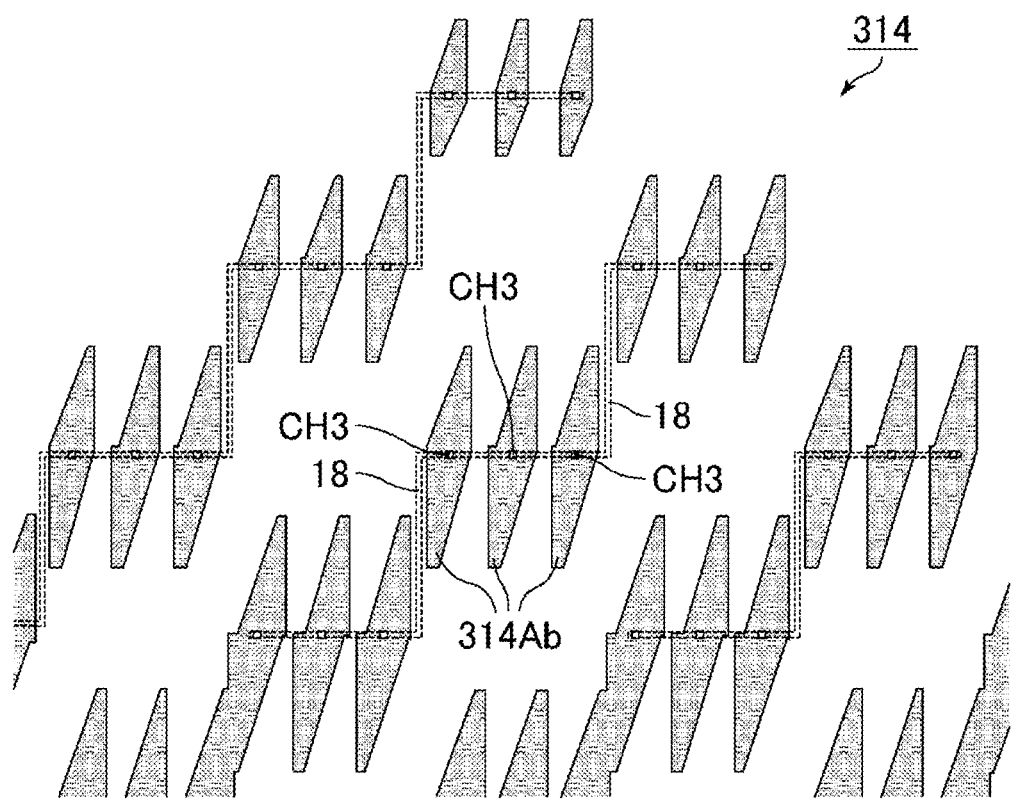
FIG. 20 is a partially enlarged schematic plan view of an example of island electrodes shown in FIG. 19.

FIG. 20 is a partially enlarged schematic plan view of an example of island electrodes shown in FIG. 19. FIG. 20 is an enlarged schematic plan view showing a part of the island electrodes surrounded by the one-dot chain line in FIG. 19. In FIG. 20, the lower-layer electrodes 18 disposed in a layer below the island electrodes 214Ab are shown by dotted lines, and the contact holes CH3 where the island electrodes 314Ab and the lower-layer electrodes 18 are connected are shown by white squares. As for the island electrodes 314Ab, for example, three island electrodes 314Ab arranged in the raw direction may be connected to each other by one lower-layer electrode 18 and may also be connected to diagonally arranged island electrodes 314Ab by the lower-layer electrodes 18 as shown in FIG. 20.

Figure 21:
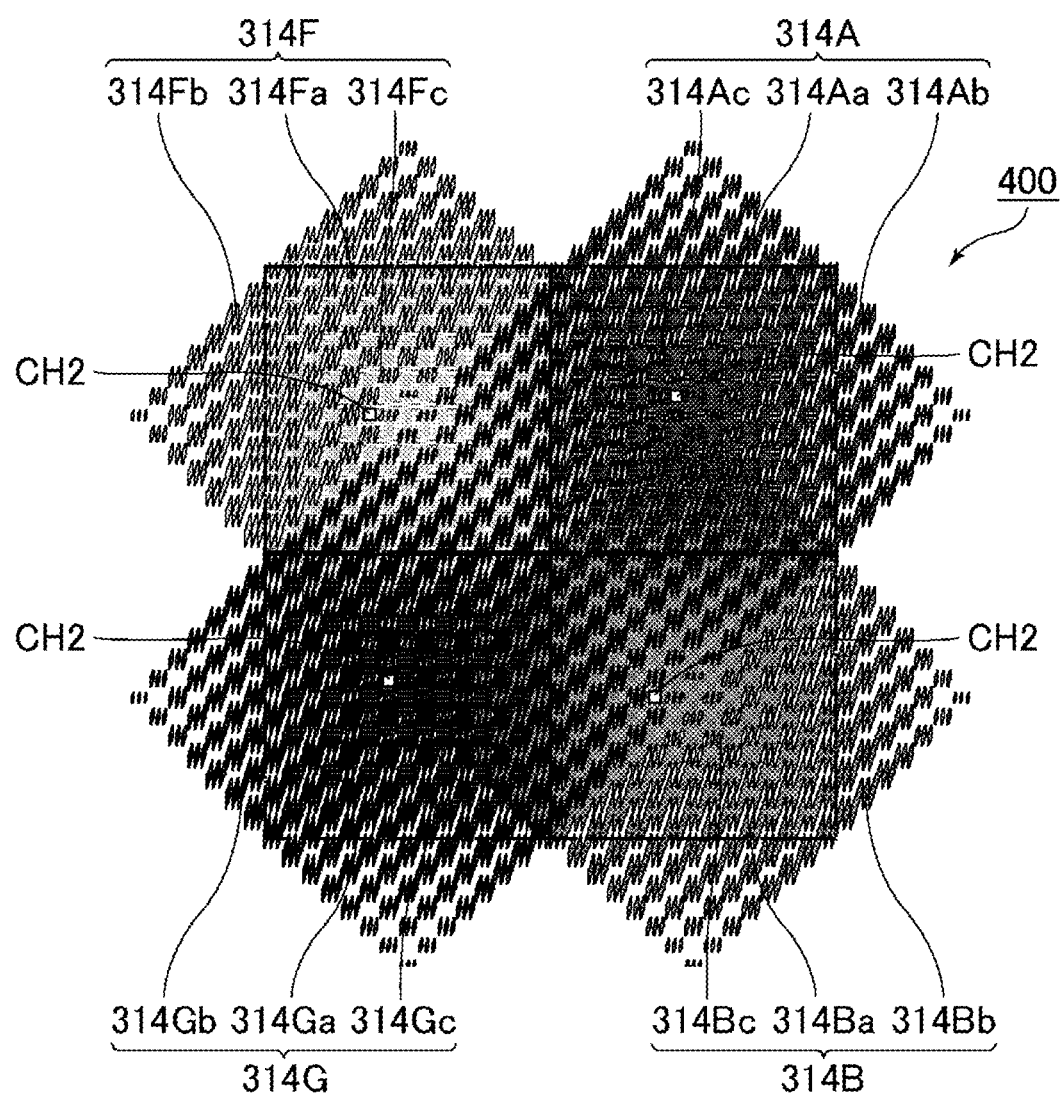
FIG. 21 is a schematic plan view of the dimming panel, showing four adjacent first dimming electrodes each having the structure shown in FIG. 19.

In the dimming panel 400 of Embodiment 4, the outer peripheral shape of the positioning areas is a quadrangle. Thus, one first dimming electrode 314A is adjacent to four other first dimming electrodes with its four sides as boundaries. FIG. 21 is a schematic plan view of the dimming panel, showing four adjacent first dimming electrodes each having the structure shown in FIG. 19. As shown in FIG. 21, at least one island electrode 314Ab of the first dimming electrode 314A is disposed inside at least one aperture 314Bc provided in the base electrode 314Ba of the first electrode 314B that is adjacent to the first electrode 314A in the up/down direction, and at least one island electrode 314Ab is disposed inside at least one aperture 314Fc provided in the base electrode 314Fa of the first dimming electrode 314F that is adjacent to the first dimming electrode 314A in the left/right direction. Also, at least one island electrode 314Bb of the first dimming electrode 314B is disposed inside at least one aperture 314Ac provided in the base electrode 314Aa of the first dimming electrode 314A, and at least one island electrode 314Fb of the first dimming electrode 314F is disposed inside at least one aperture 314Ac provided in the base electrode 314Aa of the first dimming electrode 314A.

Figure 22:
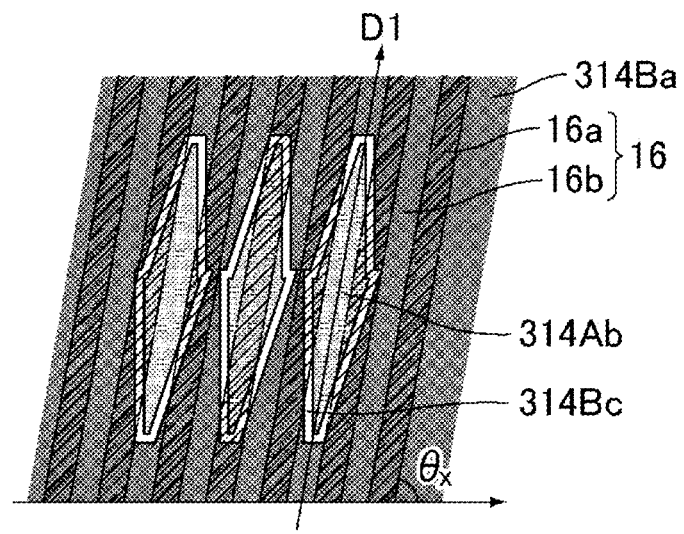
FIG. 22 is an enlarged schematic plan view of a boundary portion between adjacent first dimming electrodes shown in FIG. 21.

FIG. 22 is an enlarged schematic plan view of a boundary portion between adjacent first dimming electrodes shown in FIG. 21. FIG. 22 shows an enlarged view of a portion where the island electrodes 314Ab of the first dimming electrode 314A are disposed inside the apertures 314Bc provided in the base electrode 314Ba of the first dimming electrode 314B. When at least one island electrode 314Ab is disposed between adjacent island electrodes 314Bb or inside at least one aperture 314Bc of an adjacent first dimming electrode 314B, the adjacent first dimming electrodes are opposed to each other with a space (gap) in between. As described in Embodiment 2, the first dimming electrodes form a fringe electric field with the linear electrodes of the second electrode stacked above the first dimming electrodes with the second insulating layer in between. Portions where the gaps between the adjacent first dimming electrodes cross the linear electrodes in a plan view tend to have an alignment defect due to insufficient movement of liquid crystal molecules.

At least one island electrode 314b preferably has an outer peripheral shape including a linear portion that forms an angle of −30° to +30° with respect to the extending direction D1 of the linear electrodes 16a of the second electrode 16, provided that in a view from the second substrate 30 end, an angle formed in the clockwise direction is defined to be a negative angle and an angle formed in the counterclockwise direction is defined to be a positive angle. Setting the angle (hereinafter, also referred to as angle θy) formed by the linear portion and the extending direction of the linear electrodes 16a to −30° to +30° may increase the distance between adjacent regions with an alignment defect (portions where the gaps cross the linear electrodes) and thus allows dark lines to be less recognizable. In contrast, a structure with an angle θy of smaller than −30° or greater than +30° may reduce the distance between adjacent regions with an alignment defect and may cause dark lines to be recognizable. The angle θy is more preferably −15° to +15°.

Figure 23:
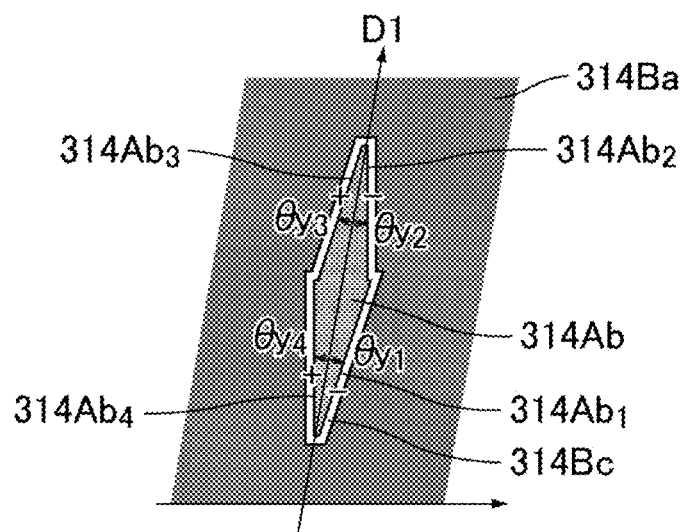
FIG. 23 is an enlarged schematic view showing an island electrode shown in FIG. 22.

FIG. 23 is an enlarged schematic view showing an island electrode shown in FIG. 22. As shown in FIG. 23, at least one island electrode 314Ab has an outer periphery including, for example, four linear portions $314Ab_1$, $314Ab_2$, $314Ab3$, and $314Ab_4$. Provided that in a view from the second substrate 30 end, an angle formed in the clockwise direction with respect to the direction D1 is defined to be a negative angle and an angle formed in the counterclockwise direction therewith is defined to be a positive angle and the direction D1 forms angles $θ_{y1}$, $θ_{y2}$, $θ_{y3}$, and $θ_{y4}$ with the linear portions $314Ab_1$, $314Ab_2$, $314Ab_3$, and $314Ab_4$, respectively, at least one angle $θ_{y1}$, $θ_{y2}$, $θ_{y3}$, or $θ_{y4}$ is preferably −30° to +30°, more preferably −15° to +15°. All of the angles $θ_{y1}$, $θ_{y2}$, $θ_{y3}$, and $θ_{y4}$ may be −30° to +30° or −15° to +15°.

At least one aperture 314c preferably has an outer peripheral shape including a linear portion that forms an angle of −30° to +30° with respect to the extending direction D1 of the linear electrodes 16a of the second electrode 16, provided that in a view from the second substrate 30 end, an angle formed in the clockwise direction is defined to be a negative angle and an angle formed in the counterclockwise direction is defined to be a positive angle. When at least one island electrode 314Ab is disposed inside at least one aperture 314Bc provided in the base electrode 314Ba of an adjacent first dimming electrode 314B, setting the angle (hereinafter, also referred to as angle θz) formed by the linear portion and the extending direction of the linear electrodes 16a to −30° to +30° increases the distance between adjacent regions with an alignment defect and thus allows dark lines to be less recognizable. In contrast, a structure with an angle θz of smaller than −30° or greater than +30° reduces the distance between adjacent regions with an alignment defect and may cause dark lines to be recognizable. The angle θz is more preferably −15° to +15°.

Figure 24:
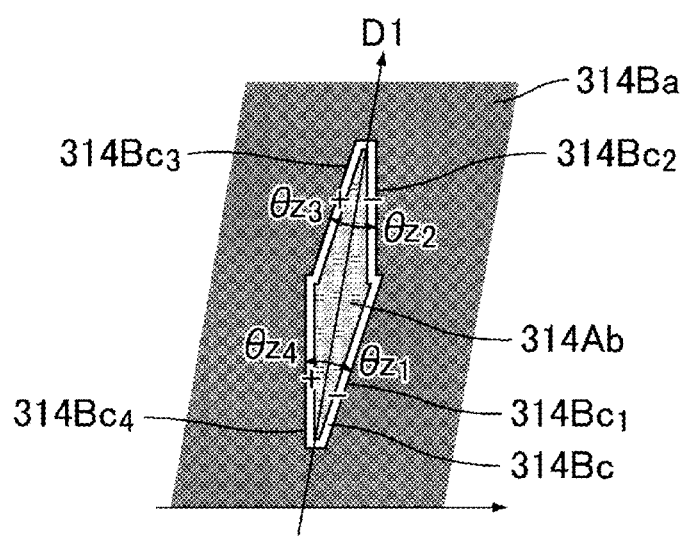
FIG. 24 is an enlarged schematic view showing an aperture shown in FIG. 22.

FIG. 24 is an enlarged schematic view showing an aperture shown in FIG. 22. In order to reduce the gap between adjacent first dimming electrodes, when at least one island electrode has a quadrangular planar shape, the peripheral shape of at least one aperture is also preferably a quadrangle. With the structure in which at least one aperture contains at least one island electrode having a similar shape to the aperture shape, the loss of the aperture ratio can be reduced. As shown in FIG. 24, similarly to the island electrodes, the first dimming electrode 314B adjacent to the first dimming electrode 314A includes at least one aperture 314Bc having an outer periphery including, for example, four linear portions $314Bc_1$, $314Bc_2$, $314Bc_3$, and $314Bc_4$ provided in the base electrode 314Ba. Provided that the direction D1 forms angles $θ_{z1}$, $θ_{z2}$, $θ_{z3}$, and $θ_{z4}$ with the linear portions $314Bc_1$, $314Bc_2$, $314Bc_3$, and $314Bc_4$, respectively, at least one angle $θ_{z1}$, $θ_{z2}$, $θ_{z3}$, or $θ_{z4}$ is preferably −30° to +30°, more preferably −15° to +15°. All of the angles $θ_{z1}$, $θ_{z2}$, $θ_{z3}$, and $θ_{z4}$ may be −30° to +30° or −15° to +15°.

In the dimming panels of Embodiments 2 to 4, boundaries between adjacent dimming units tend to be less recognizable because the luminance distribution is smoothly changed and the occurrence of dark lines on the boundaries between dimming units can be reduced or prevented. Thus, the dimming panel can also be suitably used as an anti-glare panel that controls the amount of transmitting light. The anti-glare panel can be used as a vehicle-mounted sun visor for vehicles such as automobiles and railway wagons. The dimming panel has excellent viewing angle characteristics and high transmittance, and thus can be disposed between an image-providing liquid crystal panel and a backlight to be suitably used as a member of a liquid crystal display device.

Embodiment 5

A dimming panel 500 of Embodiment 5 has the same structure as that of Embodiment 1, except that the second electrode includes second dimming electrodes disposed for the respective dimming units and the second dimming electrodes are each connected to a connection line. Thus, descriptions for the similar features are omitted here. A schematic plan view of the dimming panel 500 of Embodiment 5 is similar to FIG. 2 and thus the description thereof is not given.

Figure 25:
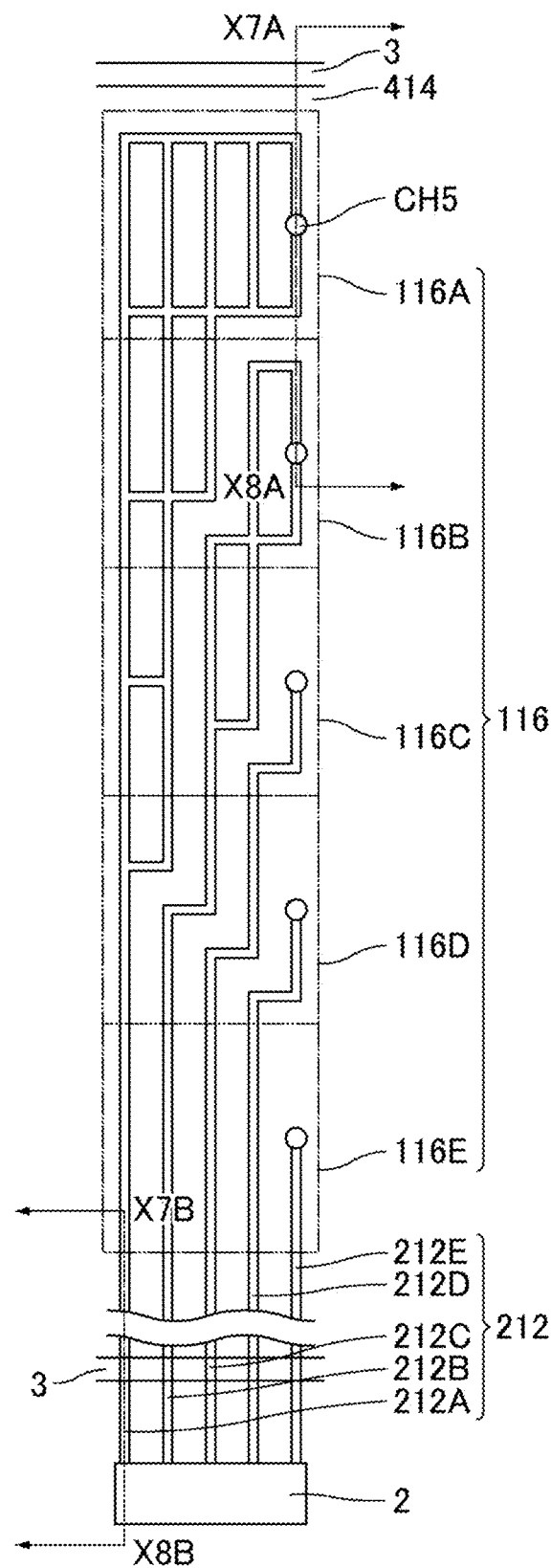
FIG. 25 is an enlarged schematic plan view of dimming units in a dimming panel of Embodiment 5, being arranged in one direction from the drive circuit.

FIG. 25 is an enlarged schematic plan view of dimming units in the dimming panel 500 of Embodiment 5, being arranged in one direction from the drive circuit. As show in FIG. 25, in Embodiment 5, the second electrode 116 includes second dimming electrodes 116A, 116B, 116C, 116D, and 116E disposed for the respective dimming units. Embodiment 1 shows an example in which the first dimming electrodes are located in the respective positioning areas indicated by the two-dot chain lines shown in FIG. 2. In Embodiment 5, the second dimming electrodes are located in the respective positioning areas. The second dimming electrodes are preferably formed from a transparent conductive material such as ITO or IZO. As shown in FIG. 25 and similarly to Embodiment 1, also in Embodiment 5, the electrode width of at least one of the connection line 212A, 212B, 212C, 212D, and 212E increases in response to an increase in the distance from the drive circuit 2. The second dimming electrodes 116A, 116B, 116C, 116D, and 116E are arranged in one direction from the drive circuit 2 and are electrically connected to the connection lines 212A, 212B, 212C, 212D, and 212E, respectively.

Figure 26A:
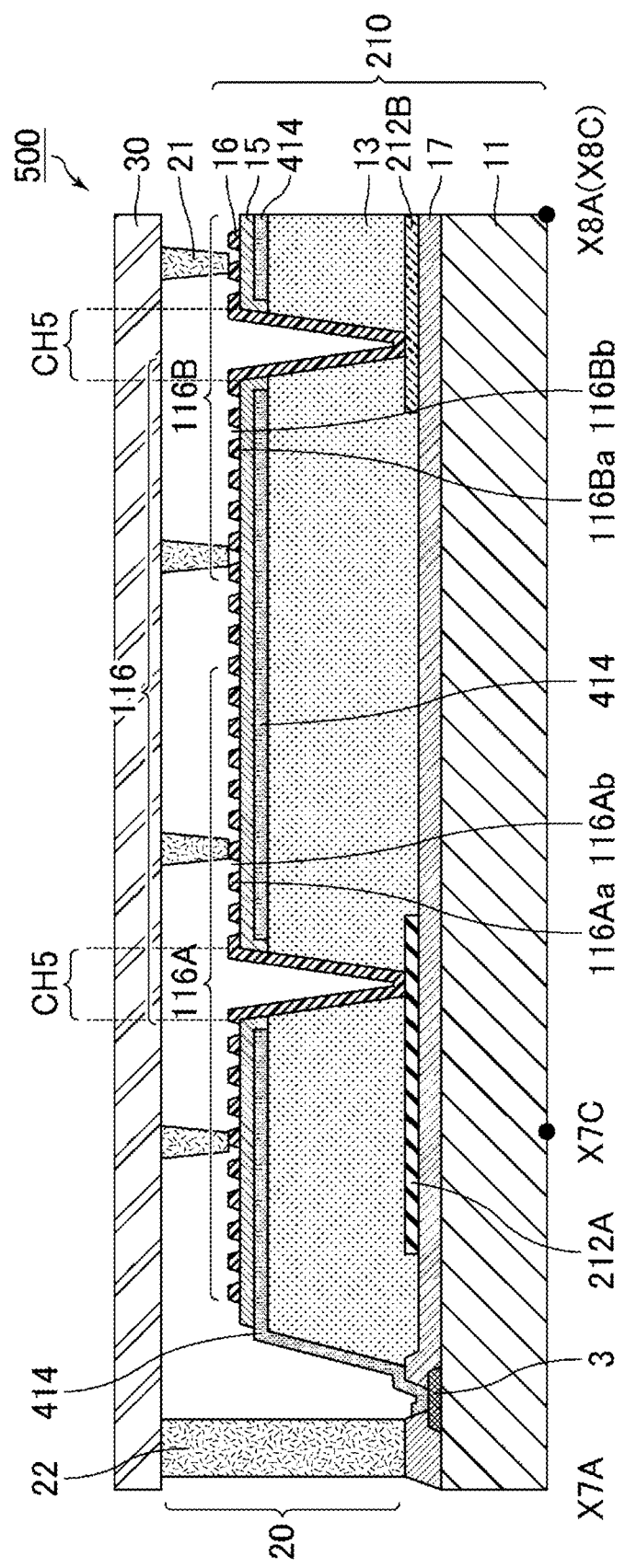
FIG. 26A is a schematic cross-sectional view taken along the line X7A-X8A in FIG. 25.
Figure 26B:
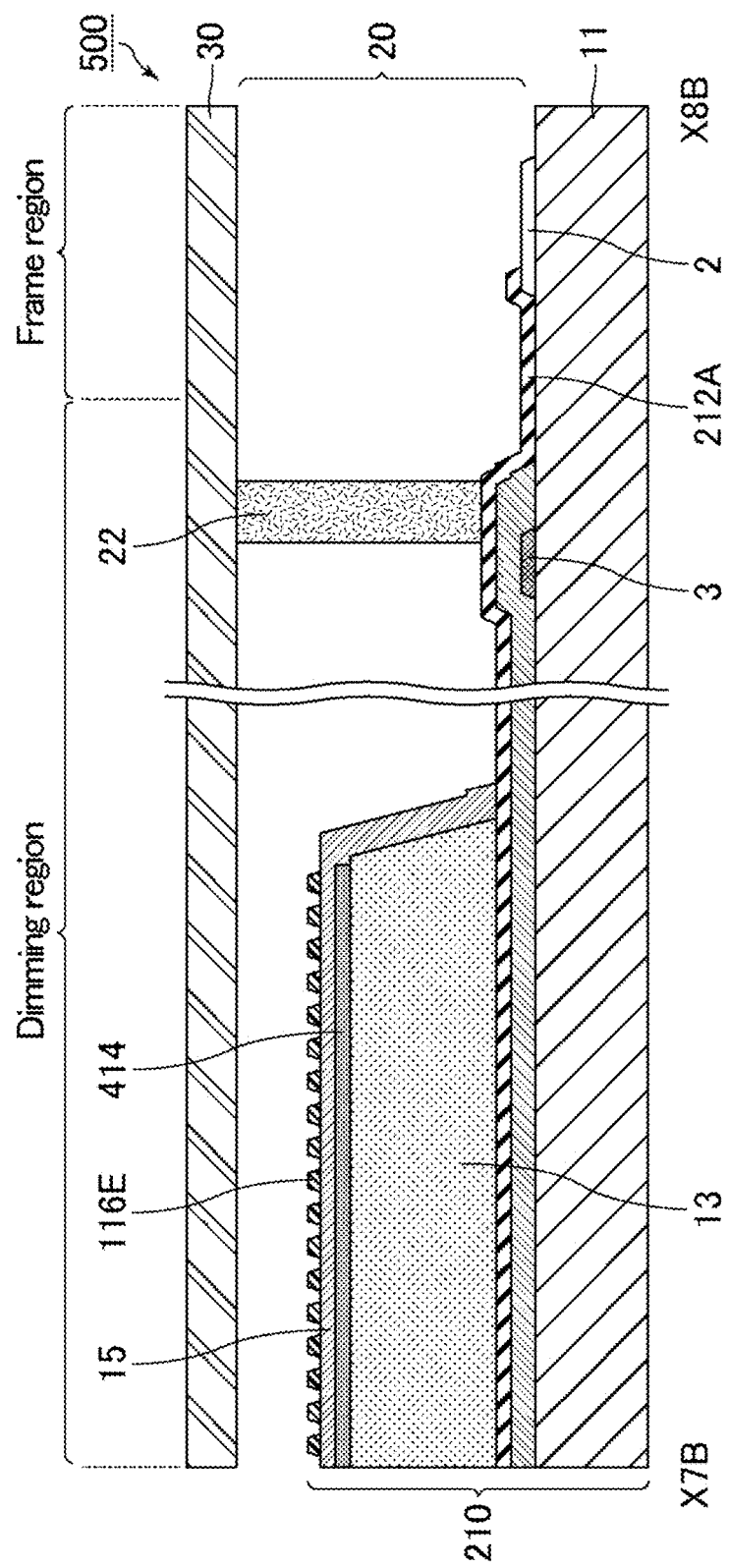
FIG. 26B is a schematic cross-sectional view taken along the line X7B-X8B in FIG. 25.

FIG. 26A is a schematic cross-sectional view taken along the line X7A-X8A in FIG. 25. FIG. 26A is also a schematic cross-sectional view taken along the line X7C-X8C in FIG. 27 described later. As shown in FIG. 26A, the dimming panel 500 of Embodiment 5 sequentially includes a first substrate 210, the liquid crystal layer 20, and the second substrate 30. The first substrate 210 sequentially includes the insulating substrate 11, the connection lines 212 (212A, 212B), the first insulating layer 13, a first electrode 414, the second insulating layer 15, and the second electrodes 116 (116A, 116B). The third insulating layer 17 may be disposed between the insulating substrate 11 and the connection lines 212. The second dimming electrodes 116A and 116B are respectively electrically connected to the connection lines 212A and 212B through contact holes CH5 extending across the first insulating layer 13 and the second insulating layer 15. FIG. 26B is a schematic cross-sectional view taken along the line X7B-X8B in FIG. 25. As shown in FIG. 26B, the connection line 212A may be electrically connected to the drive circuit 2 in the frame region.

As shown in FIG. 26A and the later-described FIG. 27, the first electrode 414 may be a plane electrode disposed in the entire dimming panel 500 except for the contact holes CH5. The first electrode 414 may be formed from a transparent conductive material such as ITO or IZO.

Preferably, the drive circuit 2 applies a constant voltage to the first electrode 414 and controls the voltages applied to the second dimming electrodes 116. As shown in FIG. 26A, the first electrode 414 may be electrically connected to the common line 3 that surrounds the dimming region and a certain reference voltage may be applied to the first electrode 414. Alternatively, the first electrode 414 may be grounded. A fringe electric field formed between the first electrode 414 and the second dimming electrodes 116 changes the alignment azimuth of the liquid crystal molecules in the liquid crystal layer 20 and thereby can control the amount of light transmitted through the dimming panel 500 for each dimming unit.

Figure 27:
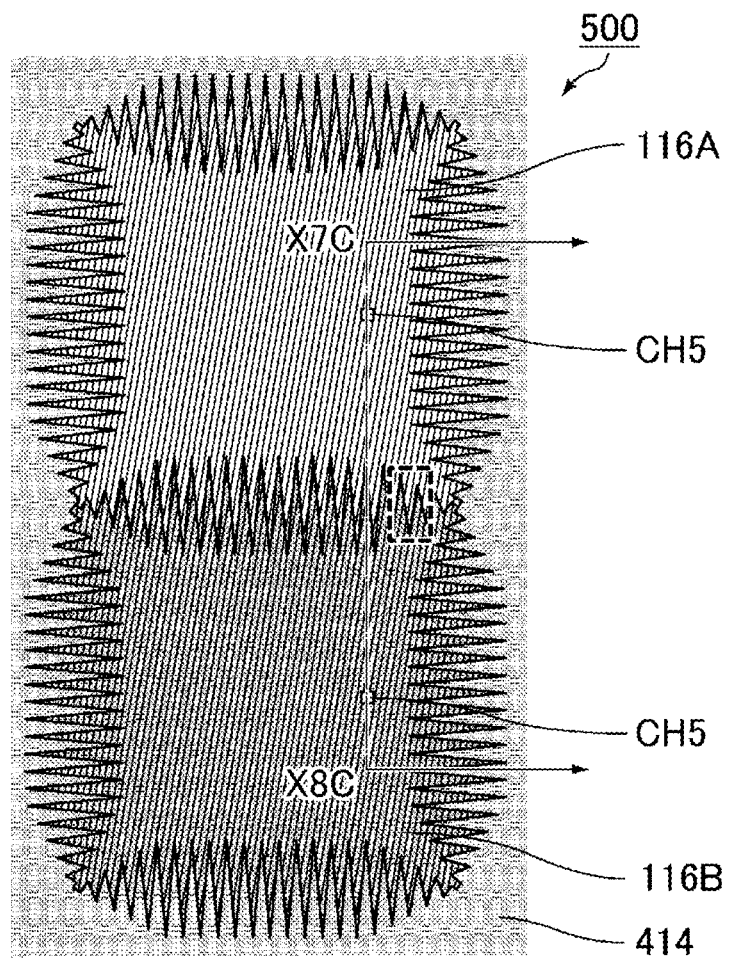
FIG. 27 is a schematic plan view of two adjacent second dimming electrodes shown in FIG. 25.
Figure 28:
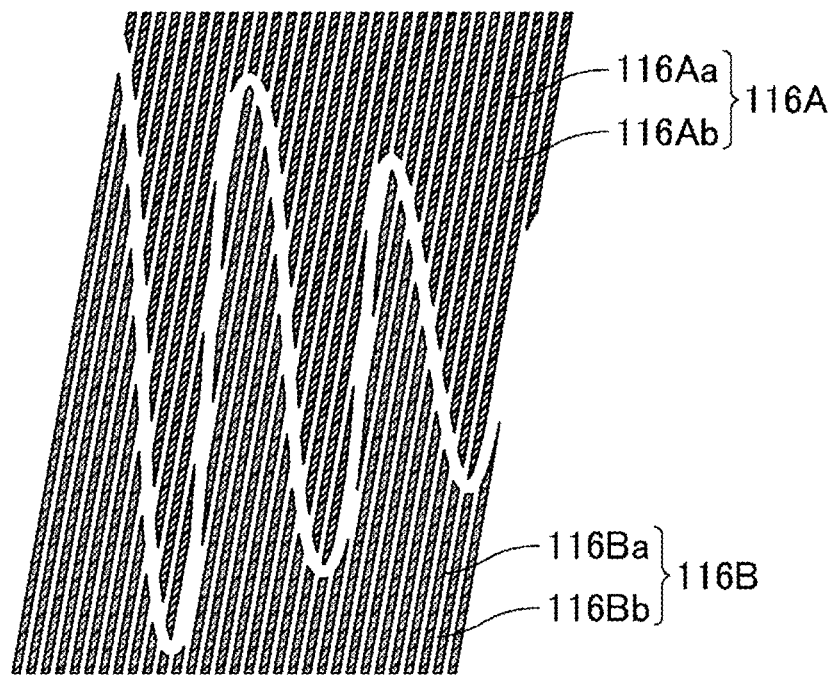
FIG. 28 is an enlarged schematic plan view showing a boundary portion between two adjacent second electrodes shown in FIG. 27.

FIG. 27 is a schematic plan view of two adjacent second dimming electrodes shown in FIG. 25. FIG. 28 is an enlarged schematic plan view showing a boundary portion between two adjacent second electrodes shown in FIG. 27. FIG. 28 is an enlarged view of the portion surrounded by the dotted line in FIG. 27. When two adjacent second dimming electrodes are focused on, the second dimming electrodes 116A and 116B in a plan view may include parallel linear electrodes 116Aa and 116Ba, respectively, as shown in FIG. 28. The region between the linear electrodes 116Aa is a slit region 116Ab. The region between the linear electrodes 116Ba is a slit region 116Bb. The linear electrodes 116Aa may be connected to each other by electrode connection portions (not shown) formed in the same layer as the linear electrodes. The linear electrodes 116Ba may be connected to each other by electrode connection portions (not shown) formed in the same layer as the linear electrodes.

As shown in FIG. 27 and FIG. 28, the boundary portion between the second dimming electrode 116A and the second dimming electrode 116B adjacent to the second dimming electrode 116A may form an irregular line (zig zag line) in a plan view. The boundary portion can have a shape with irregularities by having a structure in which the linear electrodes 116Aa and 116Ba each extend toward the adjacent dimming electrode and are faced to each other with a space in between. Such an arrangement can achieve a smooth luminance distribution between the dimming units.

Embodiment 6

Figure 29:
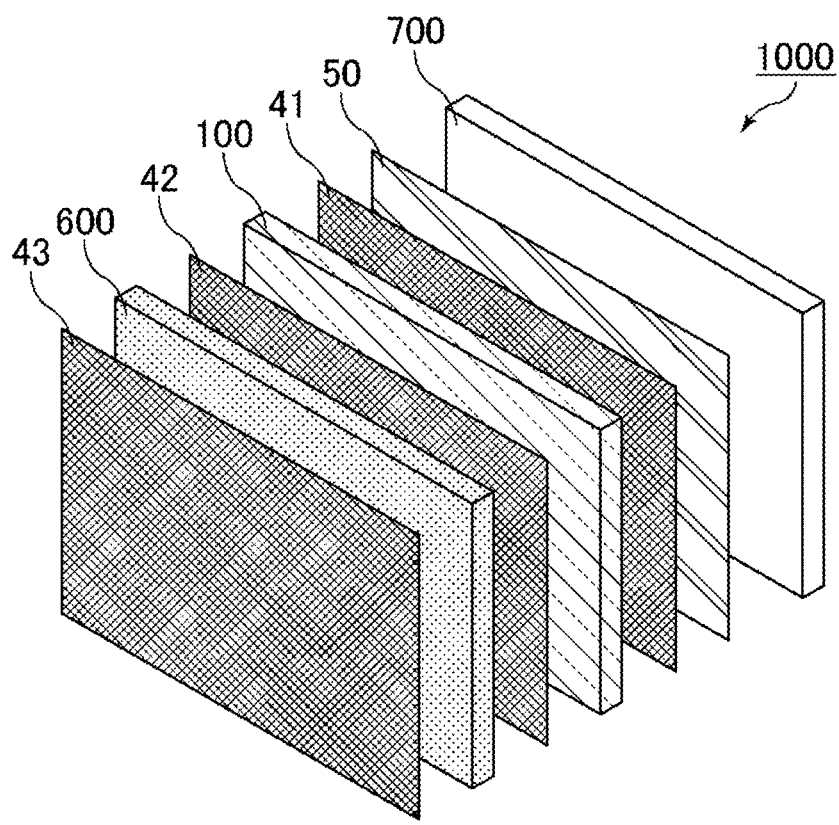
FIG. 29 is an exploded perspective view of a liquid crystal display device of Embodiment 6.

FIG. 29 is an exploded perspective view of a liquid crystal display device of Embodiment 6. As shown in FIG. 29, a liquid crystal display device 1000 of Embodiment 6 sequentially includes an image-providing liquid crystal panel 600, the dimming panel 100, and a backlight 700.

A study on methods for displaying a high quality image has been made aiming to develop a liquid crystal display device capable of performing high dynamic range (HDR) imaging. The HDR imaging enables display of a clearer image with a wider brightness range than an image with a conventional dynamic range (standard dynamic range, SDR). In order to display an image with a much wider brightness range by HDR imaging, the liquid crystal display device is required to have an increased maximum luminance and an increased contrast ratio. A method for increasing the contrast ratio of a liquid crystal display device includes dividing the light emitting surface of a backlight into multiple illuminating areas and separately driving these areas (local dimming). Unfortunately, the illuminating areas for local dimming have a significantly greater size than the pixel size of the image-providing liquid crystal panel. This may result in a halo phenomenon that causes a portion which should be displayed dark to look brightly at a boundary between images with a large difference in brightness. Disposing a dimming panel between an image-providing liquid crystal panel and a backlight can control the amount of backlight illumination transmitted for the respective dimming units constituting the dimming panel and thus can reduce the halo phenomenon while increasing the contrast ratio of the liquid crystal display device.

A pair of polarizers may be disposed on the surfaces of the image-providing liquid crystal panel 600. For example, as shown in FIG. 29, a third polarizer 43, the image-providing liquid crystal panel 600, a second polarizer 42, the dimming panel 100, and a first polarizer 41 may be sequentially disposed from the viewer side. The image-providing liquid crystal panel 600 and the dimming panel 100 may share the second polarizer 42 disposed therebetween. The third polarizer 43 is a linear polarizer, for example. Preferably, the third polarizer 43 and the second polarizer 42 are arranged with their absorption axes being perpendicular to each other, and the second polarizer 42 and the first polarizer 41 are arranged with their absorption axes being perpendicular to each other. Between the first polarizer 41 and the backlight 700 may be disposed an optical sheet 50 for diffusing light emitted from the backlight 700, such as a diffuser.

The image-providing liquid crystal panel 600 may be any liquid crystal panel, and an example thereof is a liquid crystal panel sequentially including an active matrix substrate, a liquid crystal layer, and a color filter substrate. The image-providing liquid crystal panel 600 may be a horizontally aligned mode liquid crystal panel such as a fringe field switching (FFS) mode liquid crystal panel or an in-plane switching (IPS) mode liquid crystal panel in terms of excellent viewing angle characteristics.

The active matrix substrate includes, for example, on an insulating substrate, parallel gate lines and parallel source lines extending in a direction crossing the gate lines with an insulating film in between, and, as switching elements, thin film transistors (TFTs) at the intersections of the gate lines and the source lines. A region surrounded by two adjacent gate lines and two adjacent source lines is herein referred to as a sub-pixel. The active matrix substrate includes multiple sub-pixel electrodes provided for the respective sub-pixels and each connected to the corresponding TFT via the corresponding drain electrode. In a horizontally aligned liquid crystal panel, the active matrix substrate further includes a common electrode stacked above the sub-pixel electrodes with an insulating layer in between.

The liquid crystal layer contains liquid crystal molecules. The liquid crystal molecules may have a positive anisotropy of dielectric constant ($\Delta\varepsilon$) defined by the following formula (positive type) or a negative anisotropy of dielectric constant ($\Delta\varepsilon$) (negative type).

$$\Delta\varepsilon = \text{(dielectric constant in major axis direction of liquid crystal molecules)} - \text{(dielectric constant in minor axis direction of liquid crystal molecules)} \quad (L)$$

The color filter substrate includes, for example, on an insulating substrate, color filters of multiple colors and a black matrix partitioning the color filters of the respective colors in a plan view. The color filters of multiple colors may include red color filters, green color filters, and blue color filters. The color filters of multiple colors overlap the respective sub-pixels in a plan view.

The image-providing liquid crystal panel 600 preferably includes multiple pixels that are each provided with sub-pixels of multiple colors and are arranged in a matrix in a plane. The sub-pixels of multiple colors mean sub-pixels overlapping the color filters of multiple colors. When color filters of multiple colors include red color filters, green color filters, and blue color filters, for example, a sub-pixel overlapping a red color filter is also referred to as a red sub-pixel, a sub-pixel overlapping a green color filter is also referred to as a green sub-pixel, and a sub-pixel overlapping a blue color filter is also referred to as a blue sub-pixel. The red, green, and blue sub-pixels may form one pixel. The dimming units constituting the dimming panel may be larger than the pixels constituting the image-providing liquid crystal panel. One dimming unit may dim multiple pixels.

Figure 30:
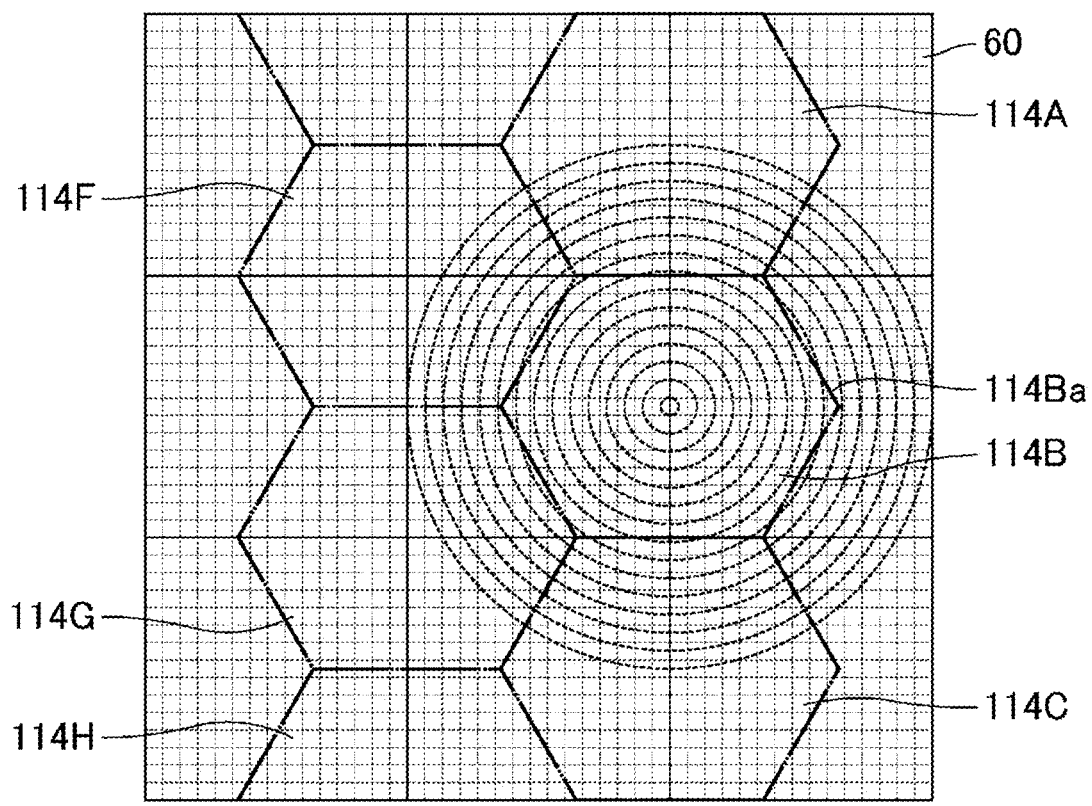
FIG. 30 is a plan view showing an arrangement example of first dimming electrodes in the liquid crystal display device of Embodiment 6, with respect to pixels of an image-providing liquid crystal panel.

The following describes a method for arranging the first dimming electrodes when the first dimming electrodes 114 each having the structure shown in FIG. 10 are used as the first electrodes of the dimming panel 100, with reference to FIG. 30 to FIG. 35. FIG. 30 is a plan view showing an arrangement example of first dimming electrodes with reference to pixels of an image-providing liquid crystal panel in a liquid crystal display device of Embodiment 6. In FIG. 30, the portions surrounded by two-dot chain lines are positioning areas for roughly locating the base electrodes 114a.

The base electrodes 114a and the island electrodes 114b of the first dimming electrodes 114 shown in FIG. 10 in the dimming panel 100 may be arranged with reference to the pixels 60 of the image-providing liquid crystal panel 600 as shown in FIG. 30. For example, multiple positioning areas are designed to be tidily arranged in a plane of the dimming panel 100, and the base electrodes 114a may be positioned with reference to the positioning areas. As shown in FIG. 30, the outer peripheral shape of each positioning area is a hexagon. The base electrodes 114Aa, 114Ba, 114Fa, and 114Ga shown in FIG. 11 can be positioned with reference to the hexagonal positioning areas tidily arranged in the plane.

The island electrodes 114Bb may be concentrically arranged from the center of the first dimming electrode 114B.

Figure 31:
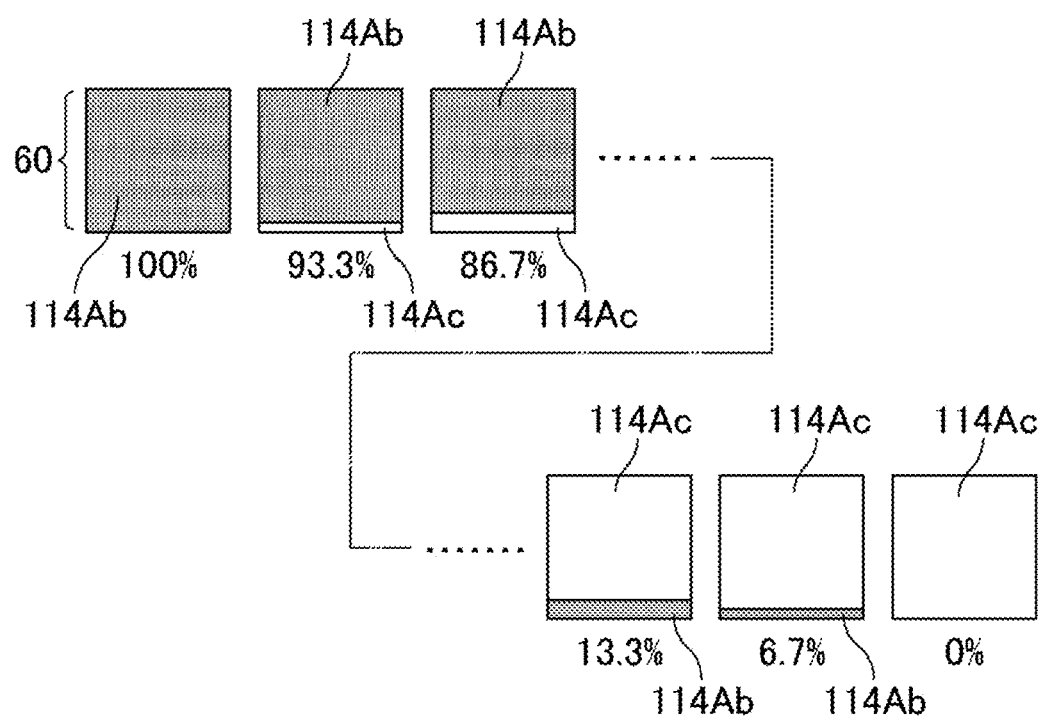
FIG. 31 is a schematic view for describing a manner for reducing the electrode area of island electrodes in the first dimming electrodes shown in FIG. 10.

Hereinafter, the arrangement of the island electrodes is described. FIG. 31 is a schematic view for describing a manner for reducing the electrode area of the island electrodes in the first dimming electrode shown in FIG. 10. As shown in FIG. 31, the areas of the island electrodes 114Ab overlapping the pixels 60 of the image-providing liquid crystal panel 600 are set in 16 grades, for example. Provided that the electrode area of an electrode portion overlapping the entire surface of one pixel 60 is defined as 100%, the areas of electrode portions overlapping the respective pixels 60 (overlapping electrode portions) gradually decrease, such as 93.3%, 86.7%, and go on, from the center of the first dimming electrode 114A toward the outer periphery of the first dimming electrode 114A.

The overlapping electrode portions are preferably disposed in a manner that no color deviation is caused when the dimming panel 100 is stacked above the image-providing liquid crystal panel 600. The island electrodes 114Ab may include an overlapping electrode portion that overlaps sub-pixels 60 of all colors included in one pixel. The overlapping electrode portion is an electrode portion overlapping a pixel 60 in a plan view.

Figure 32:
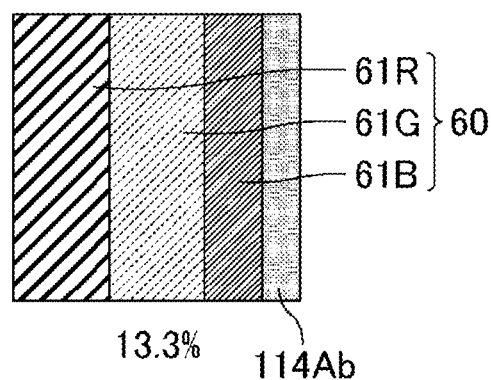
FIG. 32 is a schematic plan view showing an example of disposing an overlapping electrode portion of the first dimming electrode shown in FIG. 10 with respect to one pixel.
Figure 33:
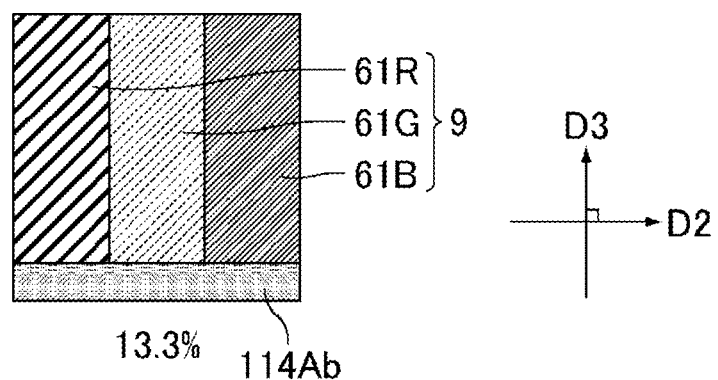
FIG. 33 is a schematic plan view showing a preferred example of disposing an overlapping electrode portion of the first dimming electrode shown in FIG. 10 with respect to one pixel.

FIG. 32 is a schematic plan view showing an example of disposing an overlapping electrode portion of the first dimming electrode shown in FIG. 10, with reference to one pixel. FIG. 33 is a schematic plan view showing a preferred example of disposing an overlapping electrode portion of the first dimming electrode shown in FIG. 10 with reference to one pixel. FIG. 32 and FIG. 33 each show a case where the electrode area of an island electrode 114Ab overlapping one pixel 60 (overlapping electrode portion) is 13.3%. As shown in FIG. 32, the pixel 60 includes a red sub-pixel 61R, a green sub-pixel 61G, and a blue sub-pixel 61B. Here, when the island electrode 114Ab (overlapping electrode portion) overlaps the blue sub-pixel 61B only, for example, the amount of light transmitted through the blue sub-pixel 61B is smaller than the amount of light transmitted through the red sub-pixel 61R and the green sub-pixel 61G, which may result in color deviation causing a failure in providing a desired color. Accordingly, the overlapping electrode portion preferably overlaps all of the red sub-pixel 61R, the green sub-pixel 61G, and the blue sub-pixel 61B included in the pixel 60 as shown in FIG. 33. More preferably, the difference between the maximum value and the minimum value among the electrode areas overlapping the respective sub-pixels of the respective colors is 30% or less of the maximum value.

Provided that the red sub-pixel 61R, the green sub-pixel 61G, and the blue sub-pixel 61B are arranged in a direction D2, adjusting the electrode width in a direction D3 that is perpendicular to the direction D2 can control the electrode areas overlapping the red sub-pixel 61R, the green sub-pixel 61G, and the blue sub-pixel 61B. In the overlapping electrode portions, the difference between the maximum value and the minimum value among electrode areas overlapping the respective sub-pixels of the respective colors may be 30% or less of the maximum value. For example, the overlapping electrode portion is disposed such that the difference between the maximum value and the minimum value among the electrode area overlapping a red sub-pixel, the electrode area overlapping a green sub-pixel, and the electrode area overlapping a blue sub-pixel is 30% or less of the maximum value. This structure can reduce the occurrence of color deviation that causes a desired color to be differently recognized due to unbalanced amounts of light transmitted through sub-pixels of the respective colors in one pixel 60. The difference between the maximum value and the minimum value among the electrode areas overlapping the respective sub-pixels of the respective colors is more preferably 10% or less, still more preferably 5% or less, of the maximum value.

In a structure where the island electrodes 114Ab are arranged in a manner that the electrode area decreases toward the outer periphery of the first dimming electrode 114A and the sub-pixels of multiple colors are supposed to be arranged in the direction D2, adjusting the electrode widths of the island electrodes 114Ab in the direction D3 that is perpendicular to the direction D2 allows the electrode area to decrease toward the outer periphery of the first dimming electrode 114A while allowing the difference between the maximum value and the minimum value among the electrode areas overlapping the respective sub-pixels of the multiple colors to be 30% or less of the maximum value.

FIG. 33 describes the case where one island electrode 114Ab is disposed for one pixel. Still, the overlapping electrode portion may have any structure as long as it overlaps sub-pixels of all colors in a plan view. Thus, one island electrode may be provided for two or more adjacent pixels. Multiple island electrodes may be provided for one pixel or for two or more adjacent pixels. At least part of one island electrode may overlap sub-pixels of all colors, or multiple island electrodes may be provided for sub-pixels of the respective colors.

Figure 34:
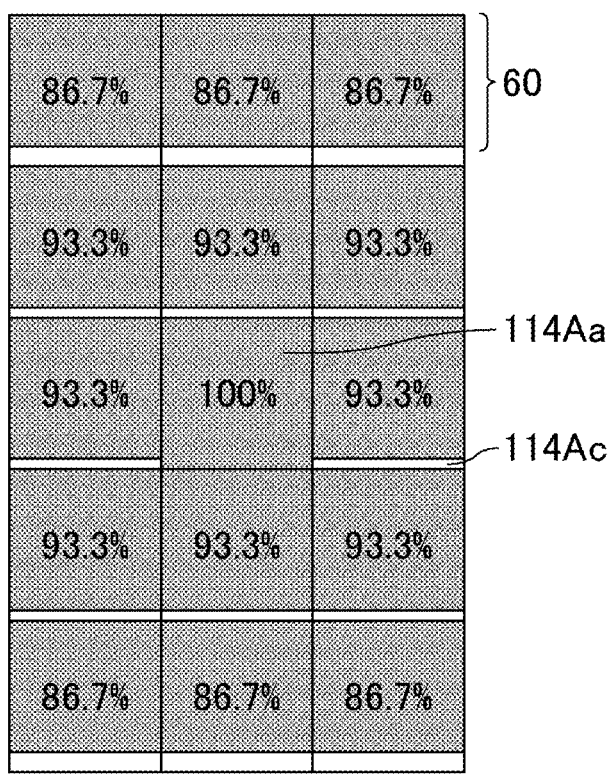
FIG. 34 is a schematic plan view showing an example of disposing overlapping aperture portions of the first dimming electrode shown in FIG. 10 with respect to the respective pixels.
Figure 35:
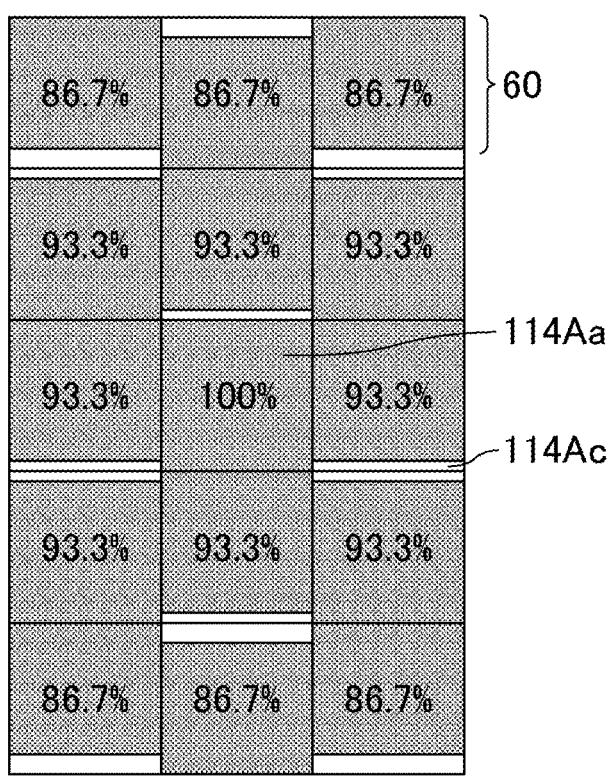
FIG. 35 is a schematic plan view showing a preferred example of disposing overlapping aperture portions of the first dimming electrode shown in FIG. 10 with respect to the respective pixels.

Hereinafter, the arrangement of multiple overlapping aperture portions provided in the base electrodes is described with reference to FIG. 34 and FIG. 35. FIG. 34 is a schematic plan view showing an example of disposing overlapping aperture portions of the first dimming electrode shown in FIG. 10 with respect to the respective pixels. FIG. 35 is a schematic plan view showing a preferred arrangement example of disposing overlapping aperture portions of the first dimming electrode shown in FIG. 10 with respect to the respective pixels. FIG. 34 and FIG. 35 are each a partially enlarged schematic plan view showing the part surrounded by the dotted line of the base electrode in FIG. 10. The numbers (%) shown in FIG. 34 and FIG. 35 each indicate the proportion of the electrode area overlapping one pixel 60 (overlapping electrode portion) relative to the area of the pixel 60 defined as 100%. The proportion of the area of an aperture overlapping the pixel 60 (overlapping aperture portion) may be appropriately set in consideration of the width (gap width) between two adjacent first dimming electrodes.

Although not shown in FIG. 34 and FIG. 35, the aperture(s) 114Ac may contain the island electrode(s) 114Bb of the adjacent first dimming electrode 114B, for example. The apertures 114Ac may include overlapping aperture portion(s) overlapping sub-pixels of all colors included in one pixel 60. The overlapping aperture portion is an aperture portion overlapping a pixel 60 in a plan view.

In the boundary portion between the first dimming electrode 114A and the first dimming electrode 114B, a dark line tends to appear due to an alignment defect of liquid crystal molecules. Thus, when multiple overlapping aperture portions (apertures 114Ac) are arranged in the raw direction of the pixels 60 as shown in FIG. 34, dark lines tend to be recognized along the raw direction. In contrast, as shown in FIG. 35, when one aperture 114Ac is disposed for two pixels adjacent in the D3 direction and the overlapping aperture portions are scattered without being arranged in a specific direction, dark lines can be less recognizable. Collecting the apertures 114Ac or the island electrodes 114Bb as shown in FIG. 35 can reduce the number of apertures on the boundary portions between the first dimming electrode 114A and the first dimming electrode 114B and thereby can reduce portions that could cause dark lines due to an alignment defect of liquid crystal molecules. The overlapping aperture portion may have any structure as long as it overlaps sub-pixels of all colors in a plan view. For example, as shown in FIG. 35, one aperture may be provided for two or more adjacent pixels, or apertures may be provided for two or more pixels. The apertures may be arranged in a manner that at least part of one aperture overlaps sub-pixels of all colors.

In the overlapping aperture portions, the difference between the maximum value and the minimum value among aperture areas overlapping the respective sub-pixels of the respective colors may be 30% or less of the maximum value. This structure can reduce the occurrence of color deviation. The difference between the maximum value and the minimum value among the aperture areas overlapping the respective sub-pixels of the respective colors is more preferably 10% or less, still more preferably 5% or less, of the maximum value.

When the apertures 114Ac are arranged in a manner that the aperture area increases toward the outer periphery of the first dimming electrode 114A, adjusting the aperture widths of the respective apertures 114Ac in the third direction allows the aperture area to increase toward the outer periphery of the first dimming electrode 114A while allowing the difference between the maximum value and the minimum value among the aperture areas overlapping sub-pixels of the multiple colors to be 30% or less of the maximum value.

The backlight 700 may be any backlight conventionally known in the field of liquid crystal display devices, and examples thereof include edge backlights and direct backlights. Driving by local dimming achieves an effect of further improving the contrast ratio. Thus, use of a direct backlight is preferred.

Hereinafter, the present invention is specifically described with reference to examples and drawings. The examples, however, are not intended to limit the present invention.

Example 1

Example 1 is a specific example of the dimming panel of Embodiment 5 and has a configuration shown in FIG. 1, FIG. 2, and FIG. 25 to FIG. 28. As shown in FIG. 2, a dimming panel of Example 1 includes the common line 3 that surrounds the dimming region. As shown in FIG. 25, the second electrode 116 includes the second dimming electrodes 116A, 116B, 116C, 116D, and 116E disposed for the respective dimming units. In Example 1, the second dimming electrodes are placed in the respective positioning areas indicated by the two-dot chain lines shown in FIG. 2. As shown in FIG. 26A, the first substrate 210 sequentially includes the insulating substrate 11, the connection lines 212 (212A, 212B), the first insulating layer 13, the first electrode 414, the second insulating layer 15, and the second electrodes 116 (116A, 116B). The second dimming electrodes 116A, 116B, 116C, 116D, and 116E are arranged in one direction from the drive circuit 2 and are electrically connected to the connection lines 212A, 212B, 212C, 212D, and 212E, respectively, through the contact holes CH5. The first electrode 414 was a plane electrode disposed for the entire dimming panel 500 except for the contact holes CH5. As shown in FIG. 26B, the connection line 212A is electrically connected to the drive circuit 2 in the frame region. The later-described wire resistance was calculated under the condition where the material for the second electrodes, the first dimming electrode, and the connection lines was ITO.

Comparative Example 1

Figure 37:
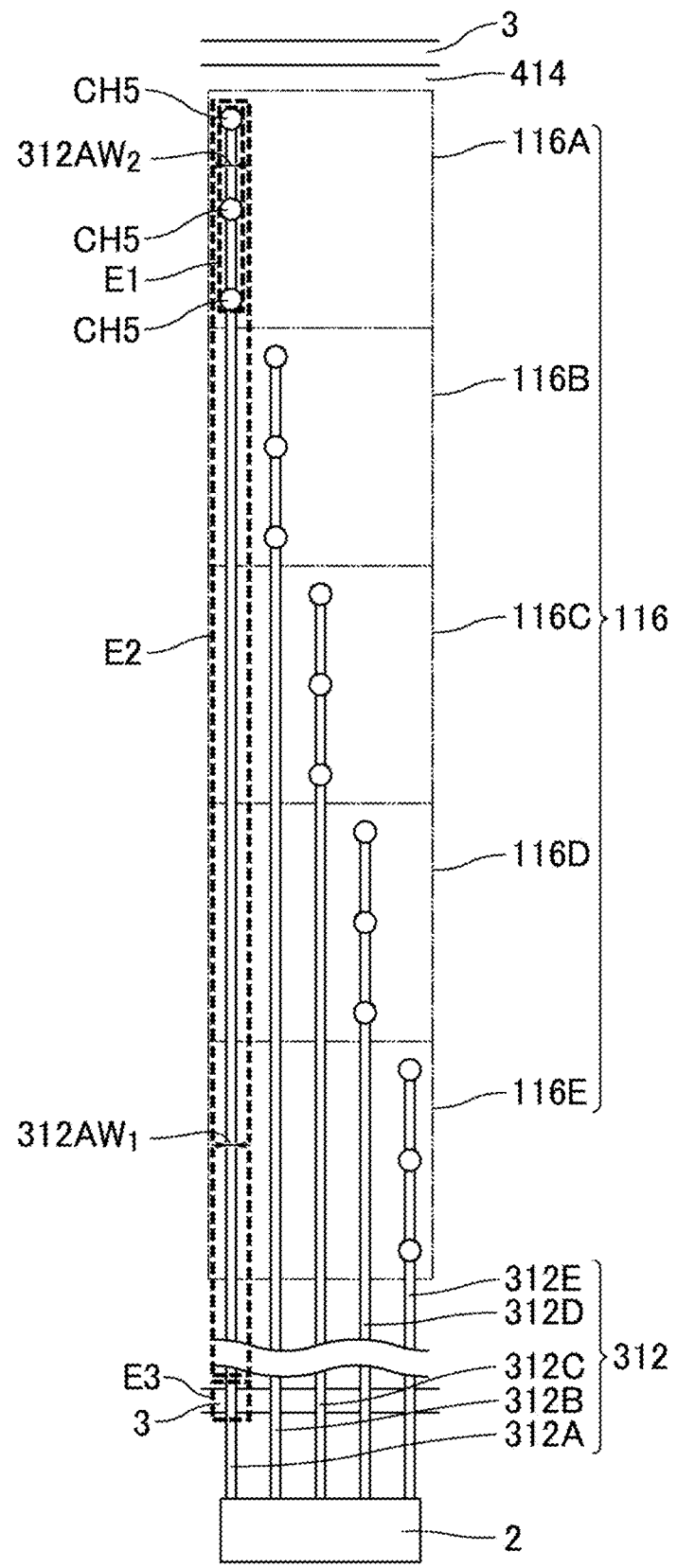
FIG. 37 is an enlarged schematic plan view of dimming units of Comparative Example 1, being arranged in one direction from the drive circuit.

A dimming panel of Comparative Example 1 has the same structure as that of Example 1 except for the structure of the connection lines. FIG. 37 is an enlarged schematic plan view of dimming units of Comparative Example 1, being arranged in one direction from the drive circuit. As shown in FIG. 37, dimming units arranged in one direction from the drive circuit 2 are provided with the second dimming electrodes 116A, 116B, 116C, 116D, and 116E. The second dimming electrodes 116A, 116B, 116C, 116D, and 116E are electrically connected to connection lines 312A, 312B, 312C, 312D, and 312E, respectively, through the different contact holes CH5. Each of the connection lines 312A, 312B, 312C, 312D, and 312E has a constant width. That is, as shown in FIG. 37, the width $312A_{W1}$ of the connection line 312A closer to the drive circuit 2 is the same as the width $312A_{W2}$ of the connection line 312A farther from the drive circuit 2.

Concerning the dimming panels having the structure of the example and the dimming panels having the structure of the comparative example, each in three sizes of 27 inches, 32 inches, and 40 inches, the wire resistance, capacitance, time constant, and charging rate were calculated. The sizes of the first dimming electrodes were adjusted such that 192 dimming units were arranged in each row and 108 dimming units were arranged in each column in each of the dimming panels having a size of 27 inches, 32 inches, and 40 inches. Determination of the wire resistance, capacitance, time constant, and charging rate was made for the connection line that was farthest from the drive circuit and was most difficult to charge. Specifically, in Example 1, the determination was made for the connection line 212A connected to the second dimming electrode 116A in FIG. 36. In Comparative Example 1, the determination was made for the connection line 312A connected to the second dimming electrode 116A in FIG. 37.

<Wiring Resistance>

Wiring resistance R was calculated according to the following formula (1). In the formula (1), Rs represents the sheet resistance (Ω/sq.) of the connection line, L represents the length of the connection line, and W represents the width of the connection line.

[Math. 1]
$$R = R_s \frac{L}{W} \tag{1}$$

<Capacitance>

Figure 36:
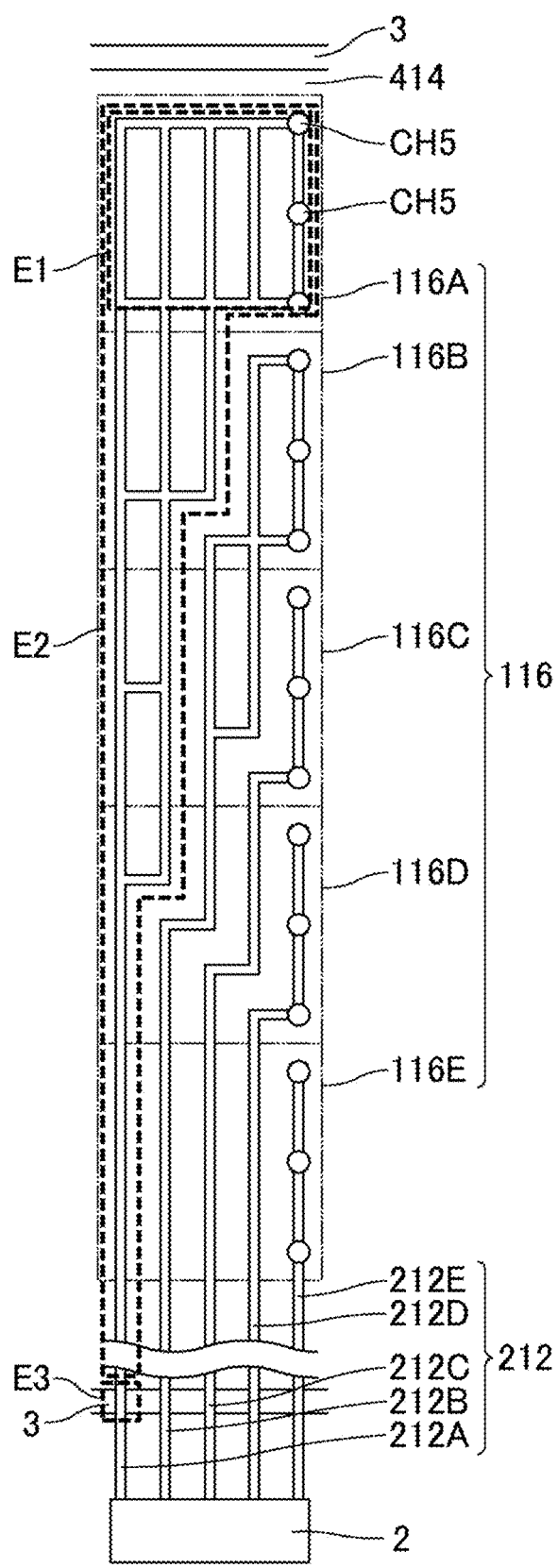
FIG. 36 is a schematic plan view showing portions for measuring the capacitances of the dimming panel of Example 1.

Concerning Example 1 and Comparative Example 1, a capacitance E1 of a dimming electrode portion, a capacitance E2 of a line display portion, and a capacitance E3 of a line intersection portion shown in FIG. 36 and FIG. 37 were calculated according to the following formula (2). FIG. 36 is a schematic plan view showing portions for determining the capacitances of the dimming panel of Example 1. FIG. 36 shows the same structure as that shown in FIG. 25 except that the portions for determining the capacitances are indicated. In the following formula (2), $\varepsilon_r$ represents the relative permittivity, so represents the vacuum permittivity, S represents the area, and d represents the distance. The capacitance E1 of the dimming electrode portion is the capacitance formed between the first electrode 414 and the dimming electrode. The capacitance E2 of the line display portion is the capacitance formed between the connection line and the first electrode 414. The capacitance E3 of the line intersection portion is the capacitance formed between the connection line and the common line 3. Table 1 shows the relative permittivity, vacuum permittivity, area, and d used for the calculation of the capacitances in Example 1 and Comparative Example 1.

[Math. 2]
$$C = \varepsilon_r \varepsilon_0 \frac{S}{d} \tag{2}$$

TABLE 1

| | Capacitance | $\varepsilon_r$ | $\varepsilon_0$ | S | d |
|---|---|---|---|---|---|
| Example 1 | Dimming electrode portion E1 | Second insulating layer 15 | Vacuum permittivity $\varepsilon 0 \approx 8.854 \times 10^{-12}$ [F/m] | Overlapping area of first electrode 414 and second dimming electrode 116 | Cross-sectional distance between first electrode 414 and second dimming electrode 116 |
| | Line display portion E2 | First insulating layer 13 | Vacuum permittivity $\varepsilon 0 \approx 8.854 \times 10^{-12}$ [F/m] | Overlapping area of connection line 212A and first electrode 414 | Cross-sectional distance between connection line 212A and first electrode 414 |
| | Line intersection portion E3 | Third insulating layer 17 | Vacuum permittivity $\varepsilon 0 \approx 8.854 \times 10^{-12}$ [F/m] | Overlapping area of connection line 212A and common line 3 | Cross-sectional distance between connection line 212A and common line 3 |
| Comparative Example 1 | Dimming electrode portion E1 | Second insulating layer 15 | Vacuum permittivity $\varepsilon 0 \approx 8.854 \times 10^{-12}$ [F/m] | Overlapping area of first electrode 414 and second dimming electrode 116 | Cross-sectional distance between first electrode 414 and second dimming electrode 116 |
| | Line display portion E2 | First insulating layer 13 | Vacuum permittivity $\varepsilon 0 \approx 8.854 \times 10^{-12}$ [F/m] | Overlapping area of connection line 312A and first electrode 414 | Cross-sectional distance between connection line 312A and first electrode 414 |
| | Line intersection portion E3 | Third insulating layer 17 | Vacuum permittivity $\varepsilon 0 \approx 8.854 \times 10^{-12}$ [F/m] | Overlapping area of connection line 312A and common line 3 | Cross-sectional distance between connection line 312A and common line 3 |

<Time Constant>

Time constant τ was calculated according to the formula: τ=RC. R represents the wire resistance obtained in the above. Capacitance C is the total of the capacitance E1 of the dimming electrode portion, the capacitance E2 of the line display portion, and the capacitance E3 of the line intersection portion.

<Charging Rate>

Charging rate X was calculated according to the following formula (3). In the formula (3), R represents the wire resistance obtained in the above. Capacitance C is the total of the capacitance E1 of the dimming electrode portion, the capacitance E2 of the line display portion, and the capacitance E3 of the line intersection portion. The charging rate X was determined under assumption of driving at 120 Hz and a condition of t=8.3 ms ($\approx 1/120$).

[Math. 3]

$$X = \left\{1 - \mathrm{EXP}\left(-\frac{t}{R \times C}\right)\right\} \times 100 \quad (3)$$

Table 2 shows the results of Example 1, and Table 3 shows the results of Comparative Example 1.

In Example 1 and Comparative Example 1, the material for the connection lines was ITO that was a transparent conductive material. Accordingly, the wire resistance is high. In particular, the wire resistance is high in Comparative Example 1 where the width of each connection line is constant. The values for the wire resistance shown in Table 3 are 100 times or more higher than a case where the connection lines are metal lines formed from a metal such as copper. Furthermore, as shown in Table 3, in Comparative Example 1, the capacitance increases in response to the size of the dimming panel and the charging rate significantly decreases.

In contrast, in Example 1 where the material for the connection lines was also ITO, the widths of the connection lines were increased in response to an increase in the distance from the drive circuit. As a result, in Example 1, the wire resistance was able to be a half or lower as compared with Comparative Example 1, and the charging rate could be high as shown in Table 1. With the structure in which the connection line connected to a dimming electrode farther from the drive circuit has a larger maximum value for the width of the connection line, the reduction in charging rate could be lowered even when the size of the dimming panel

TABLE 2

| | Screen size of dimming panel (inch) | 27 | 32 | 40 |
|---|---|---|---|---|
| | Number of divided display units | 192 × 108 | 192 × 108 | 192 × 108 |
| | Wire resistance (Ω) | 4.63E+05 | 4.43E+05 | 4.20E+05 |
| Capacitance (F) | Line intersection Rortion E3 | 1.05E−11 | 1.32E−11 | 1.83E−11 |
| | Line display portion E2 | 6.80E−10 | 9.35E−10 | 1.53E−09 |
| | Dimming electrode portion E1 | 1.35E−09 | 1.84E−09 | 2.96E−09 |
| | Total | 2.04E−09 | 2.79E−09 | 4.51E−09 |
| | Time constant (ms) | 0.94 | 1.23 | 1.89 |
| | Charging rate (%) (8.3 ms) | 100.0 | 99.9 | 98.8 |

TABLE 3

| | Screen size of dimming panel (inch) | 27 | 32 | 40 |
|---|---|---|---|---|
| | Number of divided display units | 192 × 108 | 192 × 108 | 192 × 108 |
| | Wire resistance (Ω) | 1.07E+06 | 9.96E+05 | 9.14E+05 |
| Capacitance (F) | Line intersection portion E3 | 1.05E−11 | 1.32E−11 | 1.82E−11 |
| | Line display portion E2 | 8.99E−11 | 1.32E−10 | 2.32E−10 |
| | Dimming electrode portion E1 | 1.35E−09 | 1.84E−09 | 2.96E−09 |
| | Total | 1.45E−09 | 1.98E−09 | 3.21E−09 |
| | Time constant (ms) | 1.55 | 1.98 | 2.94 |
| | Charging rate (%) (8.3 ms) | 99.5 | 98.5 | 94.1 | was increased. In Example 1, the capacitance of the line display portion becomes higher than that in Comparative Example 1 in response to the width of the connection line. Fortunately, the capacitance of the dimming electrode portion is dominative. Accordingly, the load (time constant) of the dimming panel as a whole was reduced in Example 1, whereby the wire resistance could be reduced.

What is claimed is:

1. A dimming panel comprising:
a drive circuit; and
dimming units arranged in a first direction from a drive circuit,
the dimming panel sequentially including a first substrate, a liquid crystal layer, and a second substrate,
the first substrate sequentially including an insulating substrate, connection lines formed from a transparent conductive material and connected to the drive circuit, a first insulating layer, a first electrode, a second insulating layer, and a second electrode,
the first electrode or the second electrode including dimming electrodes disposed for the respective dimming units,
each of the dimming electrodes arranged in the first direction being electrically connected to one of the connection lines,
the connection lines including a first connection line connected to one of the dimming electrodes,
an electrode width in a direction perpendicular to the first direction of the first connection line increases as a distance from the drive circuit increases.

2. The dimming panel according to claim 1,
wherein the first electrode includes first dimming electrodes disposed for the respective dimming units, and
the drive circuit is configured to control voltages applied to the respective first dimming electrodes and apply a constant voltage to the second electrode.

3. The dimming panel according to claim 2,
wherein the first substrate sequentially includes between the insulating substrate and the first electrode a lower-layer electrode and a third insulating layer from an insulating substrate side,
each of the first dimming electrodes includes island electrodes spaced from each other in a plan view and electrically connected to each other, and
at least one of the island electrodes is electrically connected to the lower-layer electrode through a contact hole.

4. The dimming panel according to claim 3,
wherein at least one of the island electrodes of a selected first dimming electrode among the first dimming electrodes is disposed in a position between island electrodes of an adjacent first dimming electrode, and
at least one of the island electrodes of the adjacent first dimming electrode is disposed in a position between island electrodes of the selected first dimming electrode.

5. The dimming panel according to claim 3,
wherein each of the first dimming electrodes further includes a base electrode provided with apertures,
the island electrodes surround the base electrode in a plan view,
the base electrode is electrically connected to the lower-layer electrode through a different contact hole,
at least one of the island electrodes of a selected first dimming electrode among the first dimming electrodes is disposed in a position inside at least one of the apertures of an adjacent first dimming electrode, and
at least one of the island electrodes of the adjacent first dimming electrode is disposed in a position inside at least one of the apertures of the selected first dimming electrode.

6. The dimming panel according to claim 1,
wherein the second electrode includes second dimming electrodes disposed for the respective dimming units, and
the drive circuit is configured to apply a constant voltage to the first electrode and control voltages applied to the respective second dimming electrodes.

7. A liquid crystal display device sequentially comprising:
an image-providing liquid crystal panel;
the dimming panel according to claim 1; and
a backlight.

8. A dimming panel comprising:
a drive circuit; and
dimming units arranged in one direction from a drive circuit,
the dimming panel sequentially including a first substrate, a liquid crystal layer, and a second substrate,
the first substrate sequentially including an insulating substrate, connection lines formed from a transparent conductive material and connected to the drive circuit, a first insulating layer, a lower-layer electrode and a third insulating layer, a first electrode, a second insulating layer, and a second electrode,
the first electrode including first dimming electrodes disposed for the respective dimming units,
each of the first dimming electrodes includes island electrodes spaced from each other in a plan view and electrically connected to each other,
at least one of the island electrodes is electrically connected to the lower-layer electrode through a contact hole,
each of the first dimming electrodes being electrically connected to one of the connection lines,
an electrode width of at least one of the connection lines increases as a distance from the drive circuit increases, and
the drive circuit is configured to control voltages applied to the respective first dimming electrodes and apply a constant voltage to the second electrode.

9. The dimming panel according to claim 8,
Wherein at least one of the island electrodes of a selected first dimming electrode among the first dimming electrodes is disposed in a position between island electrodes of an adjacent first dimming electrode, and
at least one of the island electrodes of the adjacent first dimming electrode is disposed in a position between island electrodes of the selected first dimming electrode.

10. The dimming panel according to claim 8,
wherein each of the first dimming electrodes further includes a base electrode provided with apertures,
the island electrodes surround the base electrode in a plan view,
the base electrode is electrically connected to the lower-layer electrode through a different contact hole,
at least one of the island electrodes of a selected first dimming electrode among the first dimming electrodes is disposed in a position inside at least one of the apertures of an adjacent first dimming electrode, and
at least one of the island electrodes of the adjacent first dimming electrode is disposed in a position inside at least one of the apertures of the selected first dimming electrode.

11. The dimming panel according to claim 8,
wherein the second electrode includes second dimming electrodes disposed for the respective dimming units, and
the drive circuit is configured to apply a constant voltage to the first electrode and control voltages applied to the respective second dimming electrodes.

12. A liquid crystal display device sequentially comprising:
an image-providing liquid crystal panel;
the dimming panel according to claim 8; and
a backlight.

* * * * *